(12) United States Patent
Oyama et al.

(10) Patent No.: US 11,998,879 B2
(45) Date of Patent: Jun. 4, 2024

(54) SEMIPERMEABLE MEMBRANE SUPPORT

(71) Applicant: MITSUBISHI PAPER MILLS LIMITED, Tokyo (JP)

(72) Inventors: Keisuke Oyama, Tokyo (JP); Yusuke Shimizu, Tokyo (JP); Takahito Ochiai, Tokyo (JP); Takao Masuda, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 923 days.

(21) Appl. No.: 16/494,114

(22) PCT Filed: Mar. 23, 2018

(86) PCT No.: PCT/JP2018/011595
§ 371 (c)(1),
(2) Date: Sep. 13, 2019

(87) PCT Pub. No.: WO2018/174224
PCT Pub. Date: Sep. 27, 2018

(65) Prior Publication Data
US 2020/0070103 A1 Mar. 5, 2020

(30) Foreign Application Priority Data

Mar. 24, 2017 (JP) ................................. 2017-058938
Mar. 30, 2017 (JP) ................................. 2017-068286
(Continued)

(51) Int. Cl.
*B01D 71/26* (2006.01)
*B01D 69/02* (2006.01)
(Continued)

(52) U.S. Cl.
CPC ........... *B01D 71/261* (2022.08); *B01D 69/02* (2013.01); *B01D 69/1071* (2022.08);
(Continued)

(58) Field of Classification Search
CPC ........ B01D 71/26; B01D 69/02; B01D 69/10; B01D 2325/24; D01D 5/34; D01F 8/06;
(Continued)

(56) References Cited

U.S. PATENT DOCUMENTS 5,494,735 A 2/1996 Nitta
6,293,411 B1 9/2001 Beer
(Continued)

FOREIGN PATENT DOCUMENTS

CN 105935556 9/2016
EP 1 044 719 10/2000
(Continued)

OTHER PUBLICATIONS

International Search Report dated Jun. 12, 2018 in International (PCT) Application No. PCT/JP2018/011595.
(Continued)

*Primary Examiner* — Elizabeth M Imani
(74) *Attorney, Agent, or Firm* — Wenderoth, Lind & Ponack, L.L.P.

(57) ABSTRACT

A semipermeable membrane support containing polyolefin-based fibers, which can withstand repeated washing and backwashing, makes it easy for a semipermeable membrane component to permeate thereinto and difficult for the component to strike therethrough, and is excellent in adhesion to the semipermeable membrane and adhesion between a non-coating surface thereof and a resin frame. The semipermeable membrane support which is used by forming the semipermeable membrane thereon is a wet-laid nonwoven fabric containing core-sheath type conjugate fibers composed of polypropylene as a core component and polyethylene as a sheath component and has a burst strength of 300 to 1,000 kPa, or the Bekk smoothness and 75° mirror surface glossiness of the coating surface on which the semiperme-
(Continued)

Metal
 Elastic able membrane is to be formed of the semipermeable membrane support being more than the Bekk smoothness and 75° mirror surface glossiness of a non-coating surface on the opposite side.

1 Claim, 1 Drawing Sheet

(30) Foreign Application Priority Data

| Dec. 28, 2017 | (JP) | 2017-253974 |
| Jan. 10, 2018 | (JP) | 2018-001565 |
| Jan. 25, 2018 | (JP) | 2018-010982 |

(51) Int. Cl.
  *B01D 69/10* (2006.01)
  *D01D 5/34* (2006.01)
  *D01F 8/06* (2006.01)
  *D04H 1/541* (2012.01)
  *D04H 1/544* (2012.01)

(52) U.S. Cl.
  CPC ............ *B01D 71/262* (2022.08); *D01D 5/34* (2013.01); *D01F 8/06* (2013.01); *D04H 1/5412* (2020.05); *D04H 1/5418* (2020.05); *D04H 1/544* (2013.01); *B01D 2325/24* (2013.01); *D04H 1/5414* (2020.05); *D10B 2321/021* (2013.01); *D10B 2321/022* (2013.01); *D10B 2401/20* (2013.01); *D10B 2505/04* (2013.01)

(58) Field of Classification Search
  CPC .... D04H 1/5412; D04H 1/5418; D04H 1/544; D04H 1/5414; D04H 1/541; D10B 2321/021; D10B 2321/022; D10B 2401/20; D10B 2505/04
  See application file for complete search history.

(56) References Cited

U.S. PATENT DOCUMENTS

| 6,919,026 B2 | 7/2005 | Hama et al. |
| 2005/0176330 A1 | 8/2005 | Hama et al. |
| 2012/0219756 A1* | 8/2012 | Yoshida .................. B01D 69/10 |
| | | 428/141 |
| 2012/0297977 A1 | 11/2012 | Oken |
| 2015/0121823 A1 | 5/2015 | Healey |
| 2015/0174535 A1 | 6/2015 | Soyama et al. |
| 2015/0258504 A1 | 9/2015 | Ramsey et al. |
| 2015/0353696 A1 | 12/2015 | Sano et al. |
| 2016/0228824 A1* | 8/2016 | Hane ....................... D04H 3/147 |
| 2019/0193032 A1* | 6/2019 | Shimada ................. D04H 3/033 |

FOREIGN PATENT DOCUMENTS

| EP | 3 088 072 | 11/2016 |
| JP | 56-152705 | 11/1981 |
| JP | 4-21526 | 4/1992 |
| JP | 7-227941 | 8/1995 |
| JP | 2001-17842 | 1/2001 |
| JP | 3153487 | 1/2001 |
| JP | 2001-79368 | 3/2001 |
| JP | 2002-95937 | 4/2002 |
| JP | 2009-183879 | 8/2009 |
| JP | 2010-194478 | 9/2010 |
| JP | 2012-101213 | 5/2012 |
| JP | 2012-106177 | 6/2012 |
| JP | 2012-250223 | 12/2012 |
| JP | 2013-144283 | 7/2013 |
| JP | 2014-26721 | 2/2014 |
| JP | 2014-128769 | 7/2014 |
| JP | 2014-171951 | 9/2014 |
| JP | 2015-43295 | 3/2015 |
| JP | 2016-159197 | 9/2016 |
| JP | 2017-170293 | 9/2017 |
| WO | 2011/049231 | 4/2011 |
| WO | 2013/125583 | 8/2013 |
| WO | 2017/026876 | 2/2017 |
| WO | WO-2018043322 A1 * | 3/2018 ............ B01D 63/00 |

OTHER PUBLICATIONS

"Guidelines for Introducing Membrane Technology in Sewage Works: The 2nd Edition", Sewage Technical Meeting on Membrane Technology, [online], Mar. 2011, <URL: http://www.mlit.go.jp/common/000146906.pdf>, with English translation.
Extended European Search Report dated Dec. 18, 2020 in corresponding European Patent Application No. 18771385.4.

* cited by examiner

[Fig. 1]
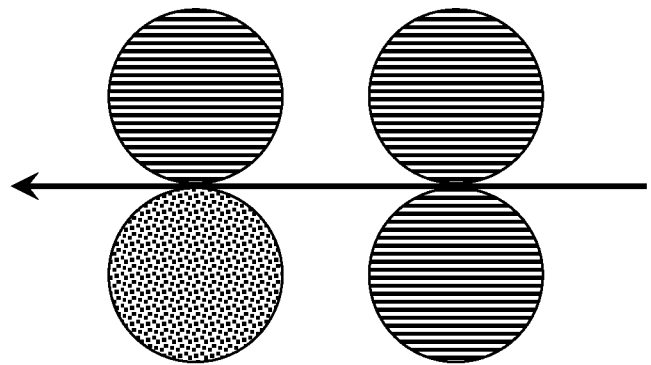
[Fig. 2]
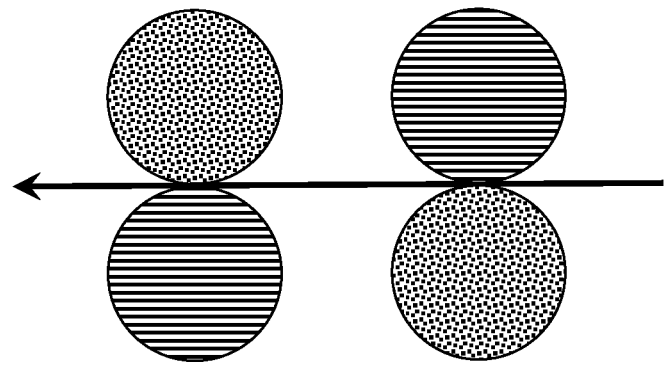

SEMIPERMEABLE MEMBRANE SUPPORT

This application is a 371 of PCT/JP2018/011595, filed Mar. 23, 2018.

TECHNICAL FIELD

The present invention relates to a semipermeable membrane support.

BACKGROUND ART

A semipermeable membrane is widely used in the field of the production of ultrapure water for medical purposes typified by the replacement of sea water by fresh water, water purifiers, food condensation, wastewater treatment and hemofiltration and for washing semiconductors. A separation function layer for semipermeable membranes is made of a porous resin such as cellulose-based resin, polysulfone-based resin, polyacrylonitrile-based resin, fluorine-based resin or polyester-based resin. However, since the layer made of one of these porous resins is inferior in mechanical strength, a "filtration membrane" in the form of a composite comprising a semipermeable membrane formed on one side of a semipermeable membrane support made of a fiber base material such as a nonwoven fabric or woven fabric is used. In a semipermeable membrane support, a surface on which a semipermeable membrane is to be formed is referred to as "coating surface" and a surface on which a semipermeable membrane is not to be formed is referred to as "non-coating surface".

For the "filtration membrane" in which the semipermeable membrane is formed on the semipermeable membrane support, a method in which a synthetic resin such as the above polysulfone-based resin is dissolved in an organic solvent to prepare a semipermeable membrane solution and then this semipermeable membrane solution is applied to the semipermeable membrane support is widely used. The filtration membrane is modularized before use. Typical modules in a sheet-like filtration membrane are a spiral module and a flat membrane type module. A typical module in a pipe-like filtration membrane is a pipe-like/tubular type module (refer to Nonpatent Document 1). The spiral module has a structure that a channel material on a raw water supply side, a filtration membrane and a channel material on a treated water permeation side are wound up together (refer to Patent Document 1). In the flat membrane type module, a filtration membrane is bonded and fixed to a frame material made of a resin such as polypropylene or acrylonitrile.butadiene.styrene copolymer synthetic resin (ABS resin) before use. Heat fusion or ultrasonic fusion is generally carried out to bond and fix the filtration membrane to the frame material.

As the semipermeable membrane support, paper made from pulp fibers and a nonwoven fabric formed from polyester fibers are generally used. However, the filtration membrane is used under various conditions, and when raw water is an alkaline liquid or when the filtration membrane is washed repeatedly or backwashed with an alkaline liquid, the semipermeable membrane support made from the above pulp fibers or polyester fibers is easily deteriorated by the alkaline liquid, thereby causing the deterioration, damage or injury of the filtration membrane (refer to Patent Documents 1 to 5).

As a semipermeable membrane support having improved alkali resistance, there are disclosed semipermeable membrane supports made from polyolefin-based fibers. For example, there are proposed a semipermeable membrane support composed of a polypropylene nonwoven fabric (refer to Patent Document 6) and a semipermeable membrane support produced by the heat treatment of olefin fibers composed of polypropylene as a core material and polyethylene as a sheath material (refer to Patent Documents 7 and 11). There is also proposed a semipermeable membrane support containing polyolefin-based main fibers and polyolefin-based binder fibers, in which the polyolefin-based main fibers are polypropylene fibers and the polyolefin-based binder fibers are core-sheath type conjugate fibers composed of a polypropylene-based resin as a core material and a polyethylene-based resin as a sheath material (refer to Patent Document 8)

Even in these filtration membranes comprising a semipermeable membrane support containing olefin-based fibers, the semipermeable membrane may deteriorate in performance by carrying out repeated washing or backwashing. Due to the performance deterioration of the semipermeable membrane, it is necessary to increase the number of washing times or to stop the apparatus to carry out maintenance, thereby taking a lot of time with the result of the reduction of operation efficiency.

When the filtration membrane comprising a semipermeable membrane support containing olefin-based fibers is bonded to a resin frame, adhesion between them is not satisfactory though the non-coating surface and the resin frame adhere to each other. In the step of forming a semipermeable membrane, there may occur a problem such as strike-through. Further, when the semipermeable membrane support contains polypropylene fibers, it is apt to fuzz on the surface thereof, whereby a membrane defect is easily produced at the time of applying a semipermeable membrane solution.

There is also proposed a semipermeable membrane support composed of a nonwoven fabric containing ethylene vinyl alcohol-based fibers as binder fibers (refer to Patent Document 9). Since the semipermeable membrane support of Patent Document 9 is inferior in heat resistance though it is excellent in texture, strength and alkali resistance, there arises a problem that wrinkles or curls are produced in a production process in which a semipermeable membrane is formed on the semipermeable membrane support.

By the way, Patent Document 8 discloses that a semipermeable membrane support having excellent adhesion between its coating surface and a semipermeable membrane is obtained by adjusting the smoothness, air permeability, tensile strength and weight thereof. There is also proposed a method of controlling the ratio of the smoothness of the coating surface to the smoothness of the non-coating surface in order to improve adhesion between the semipermeable membrane and the coating surface (refer to Patent Document 10). In Patent Documents 8 and 10, JIS P8119-based Bekk smoothness is measured. However, the Bekk smoothness is measured by a method in which time required for the removal of a certain amount of air with a predetermined pressure difference is measured while a glass reference plane is pressed against the surface of a semipermeable membrane support with a predetermined pressure. The evaluation of the adhesion of a semipermeable membrane support containing olefin-based fibers which are softened or molten by a heat treatment only by the Bekk smoothness was not satisfactory.

PRIOR ART DOCUMENTS

Patent Documents

[Patent Document 1] JP-B 04-21526
[Patent Document 2] Japanese Patent No. 3153487

[Patent Document 3] JP-A 2002-95937
[Patent Document 4] JP-A 2010-194478
[Patent Document 5] JP-A 2012-101213
[Patent Document 6] JP-A 56-152705
[Patent Document 7] JP-A 2001-17842
[Patent Document 8] JP-A 2014-128769
[Patent Document 9] JP-A 2012-250223
[Patent Document 10] WO2011/049231
[Patent Document 11] JP-A 2012-106177

Nonpatent Documents

[Nonpatent Document 1] "Guidelines for Introducing Membrane Technology in Sewage Works: The 2nd Edition" edited by Sewage Technical Meeting on Membrane Technology, [online], March 2011, [searched on Jan. 6, 2016], internet <URL: http://www.mlit.go.jp/common/000146906.pdf>

DISCLOSURE OF THE INVENTION

Problem to Be Solved By the Invention

It is an object of the present invention which was made in view of the above situation to provide a semipermeable membrane support containing polyolefin-based fibers, which can withstand repeated washing and backwashing.

It is another object of the present invention which was made in view of the above situation to provide a semipermeable membrane support containing polyolefin-based fibers, which makes it easy for a semipermeable membrane component to permeates thereinto and difficult for the component to strike therethrough and is excellent in adhesion between it and a semipermeable membrane and adhesion between the non-coating surface and a resin frame.

Means for Solving the Problem

The present invention is as follows.
<1>
A semipermeable membrane support used by forming a semipermeable membrane thereon, which is a wet-laid nonwoven fabric containing core-sheath type conjugate fibers composed of polypropylene as a core component and polyethylene as a sheath component and has a burst strength of 300 to 1,000 kPa.
<2>
A semipermeable membrane support used by forming a semipermeable membrane thereon, which is a wet-laid nonwoven fabric containing core-sheath type conjugate fibers composed of polypropylene as a core component and polyethylene as a sheath component, wherein the Bekk smoothness and 75° mirror surface glossiness of the coating surface on which a semipermeable member is to be formed of the semipermeable membrane support are more than the Bekk smoothness and 75° mirror surface glossiness of a non-coating surface on the opposite side.
<3>
The semipermeable membrane support in the above paragraph <2>, wherein the Bekk smoothness of the coating surface on which the semipermeable membrane is to be formed of the semipermeable membrane support is 1.0 to 51.0 sec. and the ratio of the Bekk smoothness of the coating surface to that of the non-coating surface is 1.3:1.0 to 1.1:1.0.
<4>
The semipermeable membrane support in the above paragraph <2> or <3>, wherein the 75° mirror surface glossiness in the MD direction of the coating surface of the semipermeable membrane support is 10 to 30%, the 75° mirror surface glossiness in the CD direction is 8 to 25%, and the ratio of the glossiness in MD direction of the coating surface to that of the non-coating surface is 1.0:0.9 to 1.0:0.7.
<5>
A semipermeable membrane support used by forming a semipermeable membrane thereon, which is a wet-laid nonwoven fabric containing core-sheath type conjugate fibers composed of polypropylene as a core component and polyethylene as a sheath component, wherein the ratio ($\beta/\alpha$) of the cross-sectional area ($\beta$) of polypropylene to the cross-sectional area ($\alpha$) of polyethylene in the core-sheath type conjugate fiber is more than 45/55 to not more than 90/10.
<6>
The semipermeable membrane support in the above paragraph <5>, wherein the content of the core-sheath type conjugate fiber composed of polypropylene as a core component and polyethylene as a sheath component and having a ratio ($\beta/\alpha$) of the cross-sectional area ($\beta$) of polypropylene to the cross-sectional area ($\alpha$) of polyethylene of more than 45/55 to not more than 90/10 is 60 to 100 mass %.
<7>
The semipermeable membrane support in anyone of the above paragraphs <1> to <6> which contains core-sheath type conjugate fibers A having an average fiber diameter of more than 9 μm to not more than 11 μm as the core-sheath type conjugate fibers and has a content of the core-sheath type conjugate fibers A of 100 mass %.
<8>
A semipermeable membrane support used by forming a semipermeable membrane thereon, which is a wet-laid nonwoven fabric containing core-sheath type conjugate fibers composed of polypropylene as a core component and polyethylene as a sheath component, wherein
  at least one type of fibers selected from the group consisting of core-sheath type conjugate fibers A having an average fiber diameter of more than 9 μm to not more than 11 μm, core-sheath type conjugate fibers B having an average fiber diameter of more than 11 μm to not more than 15 μm and core-sheath type conjugate fibers C having a fiber diameter of more than 15 μm are contained as the core-sheath type conjugate fibers;
  at least one type of fibers selected from the group consisting of the core-sheath type conjugate fibers A and the core-sheath type conjugate fibers B are contained as an essential component;
  the content ratio (A/B) of a semipermeable membrane support containing the core-sheath type conjugate fibers A and the core-sheath type conjugate fibers B is 50/50 to 90/10 based on mass;
  the content ratio (A/C) of a semipermeable membrane support containing the core-sheath type conjugate fibers A and the core-sheath type conjugate fibers C is 40/60 to 80/20 based on mass;
  the content ratio (B/C) of a semipermeable membrane support containing the core-sheath type conjugate fibers B and the core-sheath type conjugate fibers C is 70/30 to 90/10 based on mass; and
  the content ratio (A/B/C) of a semipermeable membrane support containing the core-sheath type conjugate fibers A, the core-sheath type conjugate fibers B and the core-sheath type conjugate fibers C is 40/30/30 to 80/10/10 based on mass.

Effect of the Invention

According to the present invention, there can be obtained a semipermeable membrane support which contains, as polyolefin-based fibers, core-sheath type conjugate fibers composed of polypropylene as a core component and polyethylene as a sheath component and can withstand repeated washing and backwashing.

Further, according to the present invention, there can be provided a semipermeable membrane support containing polyolefin-based fibers, which makes it easy for a semipermeable membrane component to permeate thereinto and difficult for the component to strike therethrough and is excellent in adhesion between it and a semipermeable membrane and adhesion between the non-coating surface and a resin frame.

BRIEF DESCRIPTION OF THE DRAWINGS

FIG. 1 This is a schematic diagram showing the combination and arrangement of rolls used in a hot pressing apparatus and the feeding state of a sheet in the present invention.

FIG. 2 This is a schematic diagram showing the combination and arrangement of rolls used in a hot pressing apparatus and another feeding state of a sheet in the present invention.

BEST MODE FOR CARRYING OUT THE INVENTION

The "core-sheath type conjugate fibers composed of polypropylene as a core component and polyethylene as a sheath component" may be simply referred to as "PP/PE core-sheath fibers" hereinafter.

The PP/PE core-sheath fibers used in the present invention are melt spun by using a melt spinning machine and a spinneret for core-sheath conjugate spinning. The spinning temperature is a temperature at which polyethylene as a sheath component is not modified, and a polymer is extruded at a spinning temperature of 200 to 300° C. to manufacture spun filaments having a predetermined fineness. The spun filaments are stretched as required. Stretching is carried out at a temperature at which polyethylene as a sheath component is not fused. For example, when they are stretched at 50 to 100° C. and a stretch ratio of 2 times or more, fiber strength is improved advantageously. After a fiber treating agent is added to the obtained filaments as required to control hydrophilicity and dispersibility, the filaments are cut to a predetermined length to be used as core-sheath type conjugate fibers for the production of a nonwoven fabric.

Although the core component constituting the PP/PE core-sheath fiber is polypropylene, a polyolefin such as polyethylene or polymethyl pentene may be mixed with polypropylene as required to adjust fiber physical properties. The mixing ratio of the above polyolefin is preferably not more than 10 mass % of the core component. Resin additives which are used for ordinary polyolefins may be added as required. The resin additives include antioxidants, neutralizers, optical stabilizers, ultraviolet absorbents, nucleating agents, lubricants and antistatic agents. The amount of each additive is preferably 0.01 to 1.0 mass % based on the resin.

The sheath component constituting the PP/PE core-sheath fiber is polyethylene, for example, HDPE, LDPE or LLDPE. A polyolefin such as polypropylene or ethylene-propylene copolymer may be mixed with polyethylene as required to adjust fiber physical properties. The mixing ratio of the above polyolefin is preferably not more than 10 mass % of the sheath component. Resin additives which are used for ordinary polyolefins may be added as required. The resin additives include antioxidants, neutralizers, optical stabilizers, ultraviolet absorbents, nucleating agents, lubricants and antistatic agents. The amount of each additive is preferably 0.01 to 1.0 mass % based on the resin.

In the present invention, the PP/PE core-sheath fibers function as binder fibers. The binder fibers are softened and molten by heat in the drying step or hot pressing step to exhibit adhesion, thereby contributing to adhesion between fibers and improving the mechanical strength of the semipermeable membrane support. Since the PP/PE core-sheath fibers hardly form a film, mechanical strength can be improved while spaces in the semipermeable membrane support are kept.

In the present invention, the polyolefin-based fibers are fibers produced by melt spinning a single resin or a copolymer resin obtained by polymerizing at least one monomer having at least one double bond in the molecule and containing carbon and hydrogen as constituent elements and do not include fibers produced by melt spinning a single resin or copolymer resin obtained by polymerizing a monomer containing a constituent element except for carbon and hydrogen, as exemplified by polyvinyl alcohol fibers (vinylon fibers) and ethylene-vinyl alcohol copolymer fibers. Examples of the polyolefin-based fibers which may be used in combination with the above PP/PE core-sheath fibers include fibers composed of a single component such as polyethylene fibers and polypropylene fibers, mixed polyolefin-based fibers composed of a mixture of two or more polyolefins, olefin copolymer-based fibers composed of a copolymer of two or more olefins, and core-sheath type, side-by-side type, eccentric type and splittable conjugate fibers which are combinations of resins such as polyethylene, polypropylene and olefin copolymers.

The average fiber diameter of the fibers in the present invention is a value of fiber diameter of a circle having the same cross-sectional area as each of the cross sectional areas of 50 or more fibers selected at random by observing the cross section of a wet-laid nonwoven fabric through a microscope.

The semipermeable membrane support in the present invention <1> is a semipermeable membrane support used by forming a semipermeable membrane thereon, which is a wet-laid nonwoven fabric containing as polyolefin-based fibers core-sheath type conjugate fibers composed of polypropylene as a core component and polyethylene as a sheath component. The burst strength of the semipermeable membrane support is 300 to 1,000 kPa.

In the present invention <1>, the burst strength of the semipermeable membrane support is 300 to 1,000 kPa, preferably 350 to 950 kPa, more preferably 400 to 900 kPa. When the burst strength of the semipermeable membrane support is lower than 300 kPa, a burst occurs at the time of washing, whereby the service life of the semipermeable membrane support may become short. When the burst strength of the semipermeable membrane support is higher than 1,000 kPa, the sheet turns into a film too completely, whereby the permeation of the semipermeable membrane may be impeded. Further, processability such as membrane formability at the time of applying a semipermeable membrane may deteriorate.

In the present invention <1>, the burst strength of the semipermeable membrane support can be adjusted by combining the following methods properly.

a) The content of the PP/PE core-sheath fibers should be not lower than 40 mass % based on the total of all fibers.
b) The content of all the polyolefin-based fibers including the PP/PE core-sheath fibers should be not lower than 80 mass % based on the total of all fibers.
c) The nonwoven raw fabric should be subjected to heating roll processing.

In the present invention <1>, the content of the PP/PE core-sheath fibers in the semipermeable membrane support is preferably not lower than 40 mass %, more preferably not lower than 50 mass %, much more preferably not lower than 70 mass %, particularly preferably not lower than 90 mass %, most preferably 100 mass % based on the total of all fibers. When the content of the PP/PE fibers is not lower than 40 mass %, cracks or wrinkles are hardly produced at the time of producing the nonwoven fabric, thereby improving the uniformity of the texture and production stability. Further, in the step of applying a semipermeable membrane solution, wrinkles or curls are hardly produced and adhesion between the semipermeable membrane support and the semipermeable membrane is improved.

In the present invention <1>, the content of all the polyolefin-based fibers including the PP/PE core-sheath fibers is preferably not lower than 80 mass %, more preferably not lower than 90 mass %, much more preferably not lower than 95 mass %, particularly preferably not lower than 98 mass %, most preferably 100 mass % based on the total of all fibers. When the content of the polyolefin-based fibers is not lower than 90 mass %, the semipermeable membrane support exhibits more excellent alkali resistance.

In the present invention <1>, fibers other than the polyolefin-based fibers may be contained in the semipermeable membrane support in an amount of not more than 20 mass %. The content of the fibers other than the polyolefin-based fibers is preferably not more than 10 mass %. The fibers other than the polyolefin-based fibers include synthetic fibers such as polyacrylic, vinylon-based, vinylidene-based, polyvinyl chloride-based, polyester-based, polyamide-based, benzoate-based, polychlal-based and phenol-based fibers, semisynthetic fibers such as acetate, triacetate, promix, regenerated fiber rayon, cupra and lyocell fibers, and conjugate fibers comprising these fibers and polyolefin-based fibers.

The semipermeable membrane support of the present invention <2> is a semipermeable membrane support used by forming a semipermeable membrane on one side, which is a wet-laid nonwoven fabric containing core-sheath type conjugate fibers composed of polypropylene as a core component and polyethylene as a sheath component, and the Bekk smoothness and 75° mirror surface glossiness of the coating surface on which the semipermeable membrane is to be formed of the semipermeable membrane support are more or higher than the Bekk smoothness and 75° mirror surface glossiness of the non-coating surface on the opposite side.

In the present invention <2>, preferably, the semipermeable membrane support has a Bekk smoothness of the coating surface of 1.0 to 51.0 sec. and a ratio of the Bekk smoothness of the coating surface to that of the non-coating surface of 1.3:1.0 to 1.1:1.0. Further, preferably, the semipermeable membrane support has a 75° mirror surface glossiness in the MD direction of the coating surface of 10 to 30%, a 75° mirror surface glossiness in the CD direction of the coating surface of 8 to 25% and a ratio of the glossiness in the MD direction of the coating surface to that of the non-coating surface of 1.0:0.9 to 1.0:0.7.

As a result of studies on the present invention <2>, in a wet-laid nonwoven fabric containing core-sheath type conjugate fibers composed of polypropylene as a core component and polyethylene as a sheath component, since the Bekk smoothness and 75° mirror surface glossiness of the coating surface are both more than the Bekk smoothness and 75° mirror surface glossiness of the non-coating surface on the opposite side, the formation of a uniform semipermeable membrane is promoted and a semipermeable membrane support having excellent processability at the time of processing a filtration membrane can be obtained. By using the 75° mirror surface glossiness, the percentage of fibers which have been molten by a heat treatment can be easily judged. When the number of fibers which have been molten is too large or small, processability at the time of processing a filtration membrane deteriorates.

In the present invention <2>, the Bekk smoothness of the coating surface of the semipermeable membrane support is preferably 1.0 to 51.0 sec. Within this range, when the semipermeable membrane solution is applied, it can be easily applied uniformly and therefore a uniform semipermeable membrane is easily formed. The Bekk smoothness of the coating surface of the semipermeable membrane is more preferably 10.0 to 40.0 sec., much more preferably 20.0 to 25.0 sec.

In the present invention <2>, the 75° mirror surface glossiness in the MD direction of the coating surface of the semipermeable membrane support is preferably 10 to 30%. Within this range, adhesive force between fibers on the coating surface becomes strong, the coating surface hardly fuzzes, a defect is hardly produced at the time of forming the semipermeable membrane, and a uniform semipermeable membrane is easily formed. When the semipermeable membrane solution is applied, it permeates into the inside of the semipermeable membrane support moderately, thereby making it easy to obtain high adhesion between the coating surface and the semipermeable membrane. The 75° mirror surface glossiness in the MD direction of the coating surface of the semipermeable membrane support is more preferably 15 to 25%, much more preferably 18 to 23%.

In the present invention <2>, the 75° mirror surface glossiness in the CD direction of the coating surface of the semipermeable membrane support is preferably 8 to 25%. Within this range, adhesive force between fibers on the coating surface becomes strong, the coating surface hardly fuzzes, and a defect is hardly produced at the time of forming the semipermeable membrane. When the semipermeable membrane solution is applied, it permeates into the inside of the semipermeable membrane support moderately, thereby making it easy to obtain high adhesion between the coating surface and the semipermeable membrane. The 75° mirror surface glossiness in the CD direction of the coating surface of the semipermeable membrane support is more preferably 10 to 22%, much more preferably 17 to 20%.

In the present invention <2>, the ratio of the Bekk smoothness of the coating surface to that of the non-coating surface of the semipermeable membrane support is preferably 1.3:1.0 to 1.1:1.0. The Bekk smoothness can be measured in accordance with JIS P8119 by using a Bekk smoothness tester. When the ratio of the Bekk smoothness of the coating surface to that of the non-coating surface falls within this range, curls or wrinkles are hardly produced in the step of applying the semipermeable membrane solution and adhesion between the semipermeable membrane and the semipermeable membrane support hardly deteriorates. Further, adhesion between the semipermeable membrane and the semipermeable membrane support and adhesion between the non-coating surface and the resin frame are both easily obtained. The ratio of the Bekk smoothness of the coating surface to that of the non-coating surface of the semipermeable membrane support is more preferably 1.2:1.0 to 1.1:1.0.

In the present invention <2>, the ratio of the 75° mirror surface glossiness in the MD direction of the coating surface to that of the non-coating surface of the semipermeable membrane support is preferably 1.0:0.9 to 1.0:0.7. The 75° mirror surface glossiness in the MD direction and in the CD direction can be measured in accordance with JIS P8142 by using a glossiness tester. When the ratio of the 75° mirror surface glossiness of the coating surface to that of the non-coating surface falls within this range, the strike-through of the semipermeable membrane solution hardly occurs in the step of applying the solution. Further, the semipermeable membrane support hardly curls and a defect such as a wrinkle is hardly produced in the step of applying the semipermeable membrane solution or the step of processing the filtration membrane. The ratio of the 75° mirror surface glossiness in the MD direction of the coating surface to that of the non-coating surface of the semipermeable membrane support is more preferably 1.0:0.8 to 1.0:0.7.

In the present invention <2>, the Bekk smoothness and 75° mirror surface glossiness of the coating surface, the ratio of the Bekk smoothness and the ratio of the 75° mirror surface glossiness can be adjusted by combining the following methods properly.
a) The fiber diameters of fibers constituting the semipermeable membrane support should be adjusted.
b) The weight of the semipermeable membrane support should be adjusted.
c) The heat treatment temperature of the semipermeable membrane support should be adjusted.
d) The fiber orientation of the semipermeable membrane support should be adjusted.

In the semipermeable membrane support of the present invention <2>, the content of the PP/PE core-sheath fibers is preferably not lower than 30 mass % based on the total of all fibers. It is more preferably not lower than 50 mass %, much more preferably not lower than 70 mass %, particularly preferably not lower than 90 mass %, most preferably 100 mass %. When the content of the PP/PE core-sheath fibers is not lower than 30 mass %, cracks or wrinkles are hardly produced at the time of producing the nonwoven fabric, thereby improving the uniformity of the texture and production stability. Further, wrinkles or curls are hardly produced in the step of applying the semipermeable membrane solution, and adhesion between the semipermeable membrane support and the semipermeable membrane is improved.

In the present invention <2>, the content of the PP/PE core-sheath fibers in the semipermeable membrane support is preferably not lower than 30 mass %, and the total content of all the polyolefin-based fibers including the PP/PE core-sheath fibers is preferably not lower than 90 mass %, more preferably not lower than 95 mass %, much more preferably not lower than 98 mass %, particularly preferably 100 mass % based on the total of all fibers. When the content of the polyolefin-based fibers is not lower than 90 mass %, the semipermeable membrane support exhibits excellent alkali resistance.

The semipermeable membrane support of the present invention <5> is a wet-laid nonwoven fabric containing core-sheath type conjugate fibers composed of polypropylene as a core component and polyethylene as a sheath component and semipermeable membrane support characterized in that the ratio ($\beta/\alpha$) of the cross-sectional area ($\beta$) of polypropylene to the cross-sectional area ($\alpha$) of polyethylene in the core-sheath type conjugate fiber is more than 45/55 to not more than 90/10. In this text, "the ratio ($\beta/\alpha$) of the cross-sectional area ($\beta$) of polypropylene to the cross-sectional area ($\alpha$) of polyethylene" may be referred to as "cross-sectional area ratio ($\beta/\alpha$)".

In the present invention <5>, the semipermeable membrane support contains PP/PE core-sheath fibers which are a type of polyolefin-based fibers, and the PP/PE core-sheath fibers are used as binder fibers. The cross-sectional area ratio ($\beta/\alpha$) in each PP/PE core-sheath fiber is more than 45/55 to not more than 90/10, preferably 50/50 to 80/20, more preferably 60/40 to 75/25. When the cross-sectional area ratio ($\beta/\alpha$) is more than 45/55 to not more than 90/10, the effects that the sheet has high strength and hardly turns into a film, are obtained. When the cross-sectional area ratio ($\beta/\alpha$) is not more than 45/55, the sheet easily turns into a film and the semipermeable membrane component hardly permeates into the sheet. When the cross-sectional area ratio ($\beta/\alpha$) is more than 90/10, strength lowers due to a low content of the resin as a sheath part.

In the present invention <5>, the content of the PP/PE core-sheath fibers having a cross-sectional area ratio ($\beta/\alpha$) of more than 45/55 to not more than 90/10 is preferably 60 to 100 mass %, more preferably 70 to 100 mass %, much more preferably 80 to 100 mass %, particularly preferably 100 mass %. When the content is lower than 60 mass %, the content of the resin which becomes a binder for the sheath part is low, whereby the semipermeable membrane support may be broken due to insufficient strength.

In the present invention <5>, PP/PE core-sheath fibers having a cross-sectional area ratio ($\beta/\alpha$) of not more than 45/55 and PP/PE core-sheath fibers having a cross-sectional area ratio ($\beta/\alpha$) of more than 90/10 may be used in combination.

In the present invention <5>, the binder fibers are softened and molten by heat in the drying step or hot pressing step to exhibit adhesion, whereby they are involved in adhesion to the main fibers and contribute to the improvement of mechanical strength. Since the PP/PE core-sheath fibers which are used as the binder fibers hardly form a film, they can improve mechanical strength while they keep spaces in the semipermeable membrane support.

The fiber diameter of each fiber used in the semipermeable membrane supports <1>, <2> and <5> of the present invention is preferably 1 to 30 μm, more preferably 3 to 25 μm, particularly preferably 5 to 20 μm from the viewpoint of the strength of the nonwoven fabric and productivity and from the viewpoint of adjusting the Bekk smoothness and glossiness in the present invention <2>. In the semipermeable membrane supports of the present inventions <1>, <2> and <5>, it is preferred that PP/PE core-sheath fibers having an average fiber diameter of more than 9 μm to not more than 11 μm should be contained as the PP/PE core-sheath fibers and the content thereof should be 100 mass %.

The fiber length of each fiber used in the semipermeable membrane supports <1>, <2> and <5> of the present invention is not particularly limited but preferably 1 to 20 mm, more preferably 1 to 12 mm, particularly preferably 3 to 10 mm. Although the cross-sectional shape of the fiber is preferably circular, fibers having modified cross sections such as T-type, Y-type and triangular cross sections may be contained as long as other characteristic properties such as fiber dispersibility are not impaired to prevent strike-through and obtain surface smoothness. Splittable conjugate fibers which have been made fine by water flow entanglement or a refiner may be used as well.

The semipermeable membrane support of the present invention <8> is a wet-laid nonwoven fabric containing core-sheath type conjugate fibers composed of polypropylene as a core component and polyethylene as a sheath component and characterized in that at least one type of fibers selected from the group consisting of core-sheath type conjugate fibers A having an average fiber diameter of more than 9 µm to not more than 11 µm (PP/PE core-sheath fibers A), core-sheath type conjugate fibers B having an average fiber diameter of more than 11 µm to not more than 15 µm (PP/PE core-sheath fibers B) and core-sheath type conjugate fibers C having a fiber diameter of more than 15 µm (PP/PE core-sheath fibers C) are contained as the core-sheath type conjugate fibers, and at least one of the PP/PE core-sheath fibers A and the PP/PE core-sheath fibers B are contained as an essential component.

Stated more specifically, there are the following six different semipermeable membrane supports in the present invention <8>.

1) Semipermeable membrane support containing only the PP/PE core-sheath fibers A
2) Semipermeable membrane support containing only the PP/PE core-sheath fibers B
3) Semipermeable membrane support containing the PP/PE core-sheath fibers A and B
4) Semipermeable membrane support containing the PP/PE core-sheath fibers A, B and C
5) Semipermeable membrane support containing the PP/PE core-sheath fibers A and C
6) Semipermeable membrane support containing the PP/PE core-sheath fibers B and C According to the present invention <8>, there can be obtained a semipermeable membrane support which is excellent in the permeation and adhesion of a semipermeable membrane and makes it easy for a semipermeable membrane component having high adhesion to a frame material to permeate thereinto.

In the present invention <8>, the average fiber diameter of the PP/PE core-sheath fibers A having an average fiber diameter of more than 9 µm to not more than 11 µm is more preferably more than 9.5 µm to less than 10.5 µm. When the average fiber diameter is not more than 9 µm, as the production of a semipermeable membrane support from short fibers is difficult, it is difficult to acquire the semipermeable membrane support. Further, there arise problems that adhesion between the semipermeable membrane and the semipermeable membrane support lowers, it is difficult to obtain a thick sheet and water permeability hardly rises.

In the present invention <8>, the average fiber diameter of the PP/PE core-sheath fibers B having an average fiber diameter of more than 11 µm to not more than 15 µm is more preferably more than 13.0 µm to not more than 14.5 µm. When the average fiber diameter is more than 15 µm, the fibers become thick, thereby reducing air permeability and causing a problem that the semipermeable membrane component easily strikes through.

When the PP/PE core-sheath fibers C having an average fiber diameter of more than 15 µm are used, the strength of the semipermeable membrane support is easily enhanced but when the average fiber diameter is more than 20 µm, air permeability lowers and the semipermeable membrane component strikes through significantly and is difficult to be controlled.

In the above semipermeable membrane support 3), the content ratio (A/B) of the PP/PE core-sheath fibers A to the PP/PE core-sheath fibers B is 50/50 to 90/10, preferably 60/40 to 80/20 based on mass. When this content ratio falls within the preferred range, effects that water permeability becomes high, the sheet hardly turns into a film, and the semipermeable membrane component easily permeates, are easily obtained.

In the above semipermeable membrane support 5), the content ratio (A/C) of the PP/PE core-sheath fibers A to the PP/PE core-sheath fibers C is 40/60 to 80/20, preferably 50/50 to 70/30, more preferably 60/40 based on mass. When this content ratio falls within the preferred range, effects that water permeability becomes high, the sheet hardly turn into a film, and the semipermeable membrane component easily permeates, are easily obtained.

In the above semipermeable membrane support 6), the content ratio (B/C) of the PP/PE core-sheath fibers B to the PP/PE core-sheath fibers C is 70/30 to 90/10, preferably 80/20 to 90/10 based on mass. When this content ratio falls within the preferred range, effects that water permeability becomes high, the sheet hardly turns into a film, and the semipermeable membrane component easily permeates, are easily obtained.

In the above semipermeable membrane support 4), the content ratio (A/B/C) of the PP/PE core-sheath fibers A, the PP/PE core-sheath fibers B and the PP/PE core-sheath fibers C is 40/30/30 to 80/10/10, preferably 60/20/20 to 80/10/10 based on mass. When this content ratio falls within the preferred range, effects that water permeability becomes high, the sheet hardly turns into a film, and the semipermeable membrane component easily permeates, are easily obtained.

In the present invention <8>, although the fiber length of the fiber is not particularly limited, it is preferably 1 to 12 mm, more preferably 3 to 10 mm, much more preferably 4 to 6 mm. Although the cross-sectional shape of the main fibers is preferably circular, fibers having modified cross sections such as T-type, Y-type and triangular cross sections may be contained as long as other characteristic properties such as fiber dispersibility are not impaired to prevent strike-through and obtain surface smoothness.

The semipermeable membrane support of the present invention is a nonwoven fabric containing PP/PE core-sheath fibers. The nonwoven raw fabric (sheet) can be produced by a known method called "wet paper making method".

Although fibers having a large fiber length may be used, for example, in carding and cross-layer methods, it is difficult to obtain a uniform raw fabric, the texture of the fabric is bad, and a spot pattern is seen when it is observed with transmitted light. To obtain a space diameter which can prevent the strike-through of the semipermeable membrane, a large weight must be obtained. Meanwhile, the wet paper making method has advantages that the production speed is more than those of the above methods and fibers having different fiber diameters and different types of fibers can be mixed in any ratio with the same apparatus. That is, the shape of the fiber can be selected from a wide variety of shapes such as staple-like and pulp-like shapes, as a usable fiber diameter, from extremely fine fibers to thick fibers can be used, and a raw fabric having an extremely excellent texture can be obtained as compared with the other methods. Further, when splittable conjugate fibers are used, they can be almost completely split in the step of disintegration with a disintegrator such as a pulper, high-speed mixer or beater and the dispersion step at the time of splitting the fibers. It can be said from this that this method is a raw fabric forming method which has a very wide application range. Then, the wet paper making method is most suitable as a method of producing the nonwoven raw fabric for use in the semipermeable membrane support of the present invention.

In the wet paper making method, fibers are first uniformly dispersed in water and then let pass through a screening step (removal of foreign matter or blocks), and slurry adjusted to a final fiber concentration of 0.01 to 0.50 mass % is formed into a sheet with a paper machine to obtain wet paper. During this process, chemicals such as a dispersant, defoaming agent, hydrophilic agent, antistatic agent, polymer thickener, release agent, antibacterial agent and disinfectant may be added.

As the paper machine, a paper machine in which a papermaking wire such as a Fourdrinier wire, cylinder wire or inclined wire is installed alone and a combination paper machine in which two or more papermaking wires of the same type or different types are installed online may be used. When the semipermeable membrane support of the present invention is a multi-layer nonwoven fabric, there are the following production methods: "combination method" in which wet paper sheets formed by paper machines are laminated together and "casting method" in which slurry containing fibers dispersed therein is cast onto one layer previously formed and other layers are formed on this layer. In the casting method, the layer previously formed may be in the form of wet paper or dry paper. A multi-layer nonwoven fabric may be produced by thermally bonding together two or more dry layers.

In the present invention <2>, for the adjustment of fiber orientation, for example, when paper is made by using a paper machine, fibers are easily arranged parallel to the flow direction of the paper machine by increasing the making speed and easily arranged at an angle close to a right angle to the flow direction by reducing the making speed. When the slurry containing fibers is injected onto a paper making wire, the fibers are easily arranged parallel to the flow direction of the paper machine by reducing the injection speed and easily arranged at an angle close to aright angle to the flow direction by increasing the injection speed. After the slurry containing fibers is injected onto a papermaking wire, different fiber orientation can be obtained by vibrating the papermaking wire to adjust the vibration direction, vibration speed and amplitude. The fiber orientation of the semipermeable membrane support can be controlled by using these methods alone or in combination. The fiber orientation may be controlled by using a method other than these.

Wet paper produced with a papermaking wire is let pass through a drying step for drying with a drier to obtain a sheet (nonwoven raw fabric). In the drying step of the wet paper making method, a nonwoven fabric is formed by a binder bonding method making use of the thermal fusion of binder fibers. Examples of the heat drying system of the drier in the drying step include hot plate pressure bonding system typified by a Yankee drier and hot air ventilation system typified by a band type through drier and air through drier, out of which heat drying by hot plate pressure bonding system is more preferred in the present invention. With the hot plate pressure bonding system, a nonwoven fabric having the high heat fusion efficiency of the PP/PE core-sheath fibers, the high uniformity of a texture and improved strength can be obtained.

When a fiber web is dried by bonding to the heating roll of a Yankee drier, et al., in the present inventions <1>, <5> and <8>, it is preferred that the coating surface of the semipermeable membrane support should be brought into contact with the heating roll from the viewpoints of improving the smoothness of the semipermeable membrane and adhesion between the non-coating surface and the frame material. The surface temperature of the heating roll is preferably 90 to 160° C., more preferably 100 to 150° C., much more preferably 110 to 140° C. The pressure is preferably 20 to 200 kN/m, more preferably 30 to 150 kN/m, particularly preferably 50 to 125 kN/m.

In the present invention <2>, the surface temperature of the heating roll is preferably 100 to 180° C., more preferably 100 to 160° C., much more preferably 110 to 135° C. When the surface temperature of the heating roll is lower than 100° C., the moisture of wet paper produced by the paper machine does not evaporate completely, whereby the thickness uniformity of the sheet may deteriorate, and when the surface temperature of the heating roll is more than 180° C., wet paper produced by the paper machine sticks to the heating roll, whereby the texture of the sheet may deteriorate. The pressure is preferably 5 to 100 kN/m, more preferably 10 to 80 kN/m. When the pressure is lower than 5 kN/m, the moisture of wet paper produced by the paper machine is not removed completely, whereby the thickness uniformity of the sheet may deteriorate, and when the pressure is more than 100 kN/m, wet paper produced by the paper machine sticks to the heating roll, whereby the texture of the sheet may deteriorate.

In the semipermeable membrane support of the present invention, it is more preferred that the nonwoven raw fabric should be let pass through a hot pressing step with a heating roll after the production of the nonwoven raw fabric. In the hot pressing step, the sheet produced by the wet paper making method is let pass between rolls of a hot pressing apparatus (calender apparatus) to be hot pressed while it is nipped. As a combination of rolls, a combination of two metal rolls, a combination of a metal roll and a resin roll and a combination of a metal roll and a cotton roll may be used. One or both of the two rolls are heated to be used as the heating rolls. In general, the metal roll is heated. A desired semipermeable membrane support is obtained by controlling the surface temperature of the heating roll, nip pressure between the rolls and the processing speed.

In the present invention <1>, a method in which the coating surface of the semipermeable membrane support is brought into contact with a heating roll and the non-coating surface is brought into contact with a non-heating roll is preferred as air permeability is easily controlled and the smoothness of the semipermeable membrane and adhesion between the non-coating surface and the frame material are improved. The surface temperature of the heating roll is preferably 90 to 160° C., more preferably 100 to 150° C., particularly preferably 110 to 140° C. The nip pressure of the rolls is preferably 50 to 150 kN/m, more preferably 70 to 130 kN/m, particularly preferably 80 to 120 kN/m. The processing speed is preferably 10 to 80 m/min, more preferably 20 to 70 m/min, much more preferably 25 to 60 m/min. Hot pressing with the heating roll may be carried out two times or more. In this case, two or more combinations of the above rolls arranged in series may be used, or one combination of the rolls may be used to process twice. The sheet may be turned inside out as required.

FIG. 1 and FIG. 2 are schematic diagrams showing the combination and arrangement of rolls used in the hot pressing apparatus and the feeding state of the sheet in the present invention <2>. FIG. 1 and FIG. 2 show examples to which the present invention is not limited. In FIG. 1 and FIG. 2, a metal roll is shown by a lateral striped pattern, and a cotton or elastic roll is shown by a dotted pattern. Although the metal roll, elastic roll and cotton roll may be used as heating rolls, the metal roll and elastic roll are preferably used as heating rolls. The metal roll is more preferably used as a heating roll.

In the present invention <2>, the surface temperature of the roll used for hot pressing is preferably −50° C. to +10° C. (a range from a temperature 50° C. lower to a temperature 10° C. higher), more preferably −30 to ±0° C. from the melting point or softening point of the fiber measured by differential thermal analysis. When the surface temperature of the roll is made more than 50° C. lower than the melting point or softening temperature of the fiber contained in the sheet, the sheet tends to fuzz and a semipermeable membrane having uniform thickness is hardly obtained. When the surface temperature of the roll is made more than 10° C. higher, the molten part of the fiber adheres to the metal roll, whereby the semipermeable membrane support may become nonuniform and a semipermeable membrane having uniform thickness is hardly obtained.

In the present invention <2>, the nip pressure of the heating roll used for hot pressing is preferably 50 to 250 kN/m, more preferably 70 to 180 kN/m. The processing speed is preferably 5 to 100 m/min, more preferably 10 to 50 m/min.

In the present invention <2>, the radii of the two rolls constituting a roll nip may be the same or different. The roll radius is preferably 50 to 2,000 mm, more preferably 100 to 1,500 mm. When the roll radius is smaller than 50 mm, desired thickness is hardly obtained and when the roll radius is larger than 2,000 mm, it is difficult to control the surface temperature.

In the present invention <2>, the elastic modulus of the roll is preferably 4 to 22,000 kN/cm$^2$, more preferably 200 to 21,000 kN/cm$^2$. When the elastic modulus of the roll is smaller than 4 kN/cm$^2$, the roll surface is deformed, thereby making it difficult to obtain desired thickness. When the elastic modulus is larger than 22,000 kN/cm$^2$, the roll surface becomes too hard, whereby the sheet may become wrinkled.

In the present inventions <5> and <8>, the surface temperature of the heating roll is preferably 40 to 170° C., more preferably 70 to 160° C., particularly preferably 100 to 150° C. The nip pressure of the rolls is preferably 25 to 200 kN/m, more preferably 50 to 150 kN/m, particularly preferably 75 to 125 kN/m. The processing speed is preferably 4 to 100 m/min, more preferably 10 to 80 m/min, particularly preferably 15 to 70 m/min. Hot pressing with the heating roll may be carried out two times or more. In this case, two or more combinations of the above rolls arranged in series may be used, or one combination of the rolls may be used to process twice. The sheet may be turned inside out as required.

The weight of the semipermeable membrane support is not particularly limited but preferably 20 to 150 g/m$^2$, more preferably 30 to 110 g/m$^2$, particularly preferably 40 to 80 g/m$^2$. When the weight is smaller than 20 g/m$^2$, satisfactory tensile strength may not be obtained. Further, the semipermeable membrane solution strikes through, thereby reducing the adhesion of the semipermeable membrane. When the weight is larger than 150 g/m$^2$, liquid feeding resistance may become high and a predetermined amount of the filtration membrane may not be stored in a unit or module as the thickness increases. A drying load becomes large in the production process, whereby production stability tends to deteriorate.

The semipermeable membrane support of the present invention may be a multi-layer nonwoven fabric produced by laminating together two or more nonwoven fabrics using the same method as hot processing. The nonwoven fabrics may have the same weight or different weights. In this case, a semipermeable membrane support having a weight of 150 to 300 g/m$^2$ may be obtained while a drying load is suppressed in the production process. When the weight is larger than 300 g/m$^2$, a load becomes large in the lamination step, whereby production stability tends to deteriorate.

The density of the semipermeable membrane support is preferably 0.25 to 0.90 g/cm$^3$, more preferably 0.30 to 0.80 g/cm$^3$, particularly preferably 0.35 to 0.75 g/cm$^3$. When the density of the semipermeable membrane support is lower than 0.25 g/cm$^3$, thickness becomes large, whereby the area of the filtration membrane able to be incorporated into a unit becomes small with the result that the service life of the semipermeable membrane may become short. When the density is more than 0.90 g/cm$^3$, liquid feedability may deteriorate, whereby the service life of the semipermeable membrane may become short.

The thickness of the semipermeable membrane support is preferably 50 to 300 μm, more preferably 70 to 250 μm, much more preferably 90 to 200 μm. When the thickness of the semipermeable membrane support is larger than 300 μm, the area of the filtration membrane able to be incorporated into a unit becomes small with the result that the service life of the semipermeable membrane may become short. When the thickness is smaller than 50 μm, satisfactory tensile strength may not be obtained and the service life of the semipermeable membrane may become short due to the deterioration of liquid feedability.

EXAMPLES

The following examples are provided for the purpose of further illustrating the present invention but are in no way to be taken as limiting. Unless otherwise noted, parts and ratios in the examples are based on mass.

Present Invention <1>

Example 1-1

100 parts by mass of PP/PE core-sheath fibers (average fiber diameter of 10.8 μm, fiber length of 5 mm) composed of polypropylene (melting point of 165° C.) as a core component and polyethylene (melting point of 135° C.) as a sheath component was disintegrated and dispersed in the water of a pulper and stirred gently with an agitator to prepare uniform slurry for paper making. This slurry for paper making was formed into a sheet by a wet paper making method using a cylinder paper machine and dried with a hot air hood installed in combination with a Yankee drier of hot plate pressure bonding system set at 135° C., and the sheath parts of the PP/PE core-sheath fibers were thermally melt-bonded to obtain a sheet. Then, the obtained sheet was hot pressed at a metal roll temperature of 100° C., a pressure of 100 kN/m and a processing speed of 40 m/min by using a calender apparatus having a combination of a metal roll (heating) and a resin roll (non-heating) in such a manner that the coating surface came into contact with the metal roll to obtain a semipermeable membrane support.

Example 1-2

A semipermeable membrane support was obtained in the same manner as in Example 1-1 except that 70 parts by mass of PP/PE core-sheath fibers (average fiber diameter of 10.8

μm, fiber length of 5 mm) and 30 parts by mass of PP single fibers (average fiber diameter of 11.0 μm, fiber length of 5 mm) were used.

Example 1-3

A semipermeable membrane support was obtained in the same manner as in Example 1-1 except that 60 parts by mass of PP/PE core-sheath fibers (average fiber diameter of 10.8 μm, fiber length of 5 mm) and 40 parts by mass of PP single fibers (average fiber diameter of 11.0 μm, fiber length of 5 mm) were used.

Example 1-4

100 parts by mass of PP/PE core-sheath fibers (average fiber diameter of 10.8 μm, fiber length of 5 mm) was disintegrated and dispersed in the water of a pulper and stirred gently with an agitator to prepare uniform slurry for paper making. This slurry for paper making was formed into a sheet by a wet paper making method using a cylinder paper machine, and the sheath parts of the PP/PE core-sheath fibers were thermally melt-bonded by using a band type through drier set at 135° C. to obtain a semipermeable membrane support.

Example 1-5

A semipermeable membrane support was obtained in the same manner as in Example 1-4 except that 60 parts by mass of PP/PE core-sheath fibers (average fiber diameter of 10.8 μm, fiber length of 5 mm) and 40 parts by mass of PP single fibers (average fiber diameter of 11.0 μm, fiber length of 5 mm) were used.

Example 1-6

100 parts by mass of PP/PE core-sheath fibers (average fiber diameter of 10.8 μm, fiber length of 5 mm) was disintegrated and dispersed in the water of a pulper and stirred gently with an agitator to prepare uniform slurry for paper making. This slurry for paper making was formed into a sheet by a wet paper making method using a cylinder paper machine and dried with a hot air hood installed in combination with a Yankee drier of hot plate pressure bonding system set at 135° C., and the sheath parts of the PP/PE core-sheath fibers were thermally melt-bonded to obtain a sheet. Then, the obtained sheet was hot pressed at a metal roll temperature of 100° C., a pressure of 80 kN/m and a processing speed of 40 m/min by using a calender apparatus having a combination of a metal roll (heating) and a resin roll (non-heating) in such a manner that the coating surface came into contact with the metal roll to obtain a semipermeable membrane support.

Example 1-7

A semipermeable membrane support was obtained in the same manner as in Example 1-1 except that 40 parts by mass of PP/PE core-sheath fibers (average fiber diameter of 10.8 μm, fiber length of 5 mm) and 60 parts by mass of PP single fibers (average fiber diameter of 11.0 μm, fiber length of 5 mm) were used.

Example 1-8

A semipermeable membrane support was obtained in the same manner as in Example 1-1 except that 50 parts by mass of PP/PE core-sheath fibers (average fiber diameter of 10.8 μm, fiber length of 5 mm) and 50 parts by mass of PP single fibers (average fiber diameter of 11.0 μm, fiber length of 5 mm) were used.

Example 1-9

A semipermeable membrane support was obtained in the same manner as in Example 1-1 except that 80 parts by mass of PP/PE core-sheath fibers (average fiber diameter of 10.8 μm, fiber length of 5 mm) and 20 parts by mass of PET stretched single fibers (PET single fibers, average fiber diameter of 10.5 μm, fiber length of 5 mm) were used.

Comparative Example 1-1

A semipermeable membrane support was obtained in the same manner as in Example 1-1 except that 30 parts by mass of PP/PE core-sheath fibers (average fiber diameter of 10.8 μm, fiber length of 5 mm) and 70 parts by mass of PP single fibers (average fiber diameter of 11.0 μm, fiber length of 5 mm) were used.

Comparative Example 1-2

A semipermeable membrane support was obtained in the same manner as in Example 1-4 except that 30 parts by mass of PP/PE core-sheath fibers (average fiber diameter of 10.8 μm, fiber length of 5 mm) and 70 parts by mass of PP single fibers (average fiber diameter of 11.0 μm, fiber length of 5 mm) were used.

Comparative Example 1-3

A semipermeable membrane support was obtained in the same manner as in Example 1-1 except that 70 parts by mass of PP/PE core-sheath fibers (average fiber diameter of 10.8 μm, fiber length of 5 mm) and 30 parts by mass of PET stretched single fibers (average fiber diameter of 10.5 μm, fiber length of 5 mm) were used.

Comparative Example 1-4

70 parts by mass of PP/PE core-sheath fibers (average fiber diameter of 10.8 μm, fiber length of 5 mm) and 30 parts by mass of PP single fibers (average fiber diameter of 11.0 μm, fiber length of 5 mm) were disintegrated and dispersed in the water of a pulper and stirred gently with an agitator to prepare uniform slurry for paper making. This slurry for paper making was formed into a sheet by a wet paper making method using a cylinder paper machine and dried with a hot air hood installed in combination with a Yankee drier of hot plate pressure bonding system set at 135° C., and the sheath parts of the PP/PE core-sheath fibers were thermally melt-bonded to obtain a sheet. Then, the obtained sheet was hot pressed at a metal roll temperature of 100° C., a pressure of 40 kN/m and a processing speed of 30 m/min by using a calender apparatus having a combination of a metal roll (heating) and a resin roll (non-heating) in such a manner that the coating surface came into contact with the metal roll to obtain a semipermeable membrane support.

The following measurements and evaluations were made on the semipermeable membrane supports obtained in the above Examples and Comparative Examples, and the results are shown in Table 1.

Measurement 1-1 (Average Fiber Diameter)

The average fiber diameter of fibers constituting the nonwoven fabric was obtained as follows. The cross sections of the fibers were observed through a microscope to calculate the total cross-sectional area of 50 or more fibers selected at random with image analyzing software. Supposing that the fibers were spherical, the fiber diameters were calculated from the area and the average value of these was taken as "average fiber diameter".

Measurement 1-2 (Weight)

The weight of the semipermeable membrane support was measured in accordance with JIS P8124.

Measurement 1-3 (Thickness)

The thickness of the semipermeable membrane support was measured in accordance with JIS P8118.

Measurement 1-4 (Burst Strength)

The burst strength of the semipermeable membrane support was measured in accordance with JIS P8112.

Evaluation 1-1 (Permeation of Semipermeable Membrane)

A comma coater having a predetermined clearance was used to apply an N,N-dimethylformamide (DMF) solution (concentration of 22%) of polysulfone resin (manufactured by SOLVAY, Udel P-3500 LCD MB3, molecular weight of 78,000 to 84,000 g/mol) as a semipermeable membrane solution to the coating surface of a semipermeable membrane support, and rinsing and drying were carried out to form a polysulfone membrane (semipermeable membrane) on the coating surface of the semipermeable membrane support so as to obtain a filtration membrane. A SEM photo of the cross section of the filtration membrane was taken to evaluate the degree of permeation of the semipermeable membrane into the semipermeable membrane support.

◎: sulfone resin permeates only in an area near the center of semipermeable membrane support. Extremely high level.

○: polysulfone resin does not ooze out to the non-coating surface of semipermeable membrane support. High level.

Δ: polysulfone resin partially oozes out to the non-coating surface of semipermeable membrane support. Practically usable level.

χ: polysulfone resin oozes out to the non-coating surface of semipermeable membrane support. Unusable level.

Evaluation 1-2 (Adhesion to Semipermeable Membrane)

Adhesion between the semipermeable membrane support and the semipermeable membrane in the filtration membrane manufactured in Evaluation 1-1 was evaluated. One day after the manufacture of the filtration membrane, the semipermeable membrane and the semipermeable membrane support were separated from each other slowly at the interface between them to judge "adhesion to semipermeable membrane" by the degree of resistance at the time of separation.

◎: adhesion between semipermeable membrane and semipermeable membrane support is so high that they cannot be separated. Extremely high level.

○: there is a part where they are easily separated. High level.

Δ: although semipermeable membrane and semipermeable membrane support are bonded to each other, they are easily separated as a whole. Practically, lower limit level.

χ: separation occurs in rinsing or drying step after coating of semipermeable membrane. Unusable level.

Evaluation 1-3 (Washing Resistance)

The washing resistance of the filtration membrane manufactured in Evaluation 1-1 was evaluated. One day after the manufacture of the filtration membrane, the surface of the semipermeable membrane was rubbed vertically with a nylon brush 10 times and shaken in water to judge "washing resistance" by the degree of damage to the semipermeable membrane and the semipermeable membrane support.

◎: it can be judged that both semipermeable membrane and semipermeable membrane support can be used without problems.

○: it can be judged that they are damaged but can be used without problems.

Δ: they are greatly damaged but can be used. Practically, lower limit level.

χ: it is judged that they are greatly damaged and cannot be used.

TABLE 1

| | Fibers 1 | amount pbm | Average Fiber diameter μm | Fibers 2 | amount pbm | Average Fiber diameter μm | Weight (g/m²) | Thickness (μm) | Burst strength (kPa) | permeation of semipermeable membrane | adhesion of semipermeable membrane | Washing resistance |
|---|---|---|---|---|---|---|---|---|---|---|---|---|
| EX. 1-1 | PP/PE csf | 100 | 10.8 | — | — | — | 60.0 | 92 | 920 | ○ | ◎ | ◎ |
| Ex. 1-2 | PP/PE csf | 70 | 10.8 | PP single fibers | 30 | 11.0 | 60.4 | 96 | 500 | ○ | ○ | ◎ |
| Ex. 1-3 | PP/PE csf | 60 | 10.8 | PP single fibers | 40 | 11.0 | 60.8 | 99 | 450 | ◎ | ○ | ◎ |
| Ex. 1-4 | PP/PE csf | 100 | 10.8 | — | — | — | 60.1 | 110 | 780 | ○ | ◎ | ○ |
| Ex. 1-5 | PP/PE csf | 60 | 10.8 | PP single fibers | 40 | 11.0 | 60.5 | 122 | 430 | ◎ | ○ | ○ |
| Ex. 1-6 | PP/PE csf | 100 | 10.8 | — | — | — | 60.0 | 122 | 500 | ○ | ◎ | ◎ |
| Ex. 1-7 | PP/PE csf | 40 | 10.8 | PP single fibers | 60 | 11.0 | 60.1 | 132 | 370 | ◎ | ○ | ○ |
| Ex. 1-8 | PP/PE csf | 50 | 10.8 | PP single fibers | 50 | 11.0 | 60.2 | 120 | 400 | ◎ | ○ | ◎ |
| Ex. 1-9 | PP/PE csf | 80 | 10.8 | PET single fibers | 20 | 10.5 | 60.1 | 98 | 570 | ○ | ○ | Δ |
| C. Ex. 1-1 | PP/PE csf | 30 | 10.8 | PP single fibers | 70 | 11.0 | 60.0 | 114 | 280 | ◎ | X | X |
| C. Ex. 1-2 | PP/PE csf | 30 | 10.8 | PP single fibers | 70 | 11.0 | 60.2 | 130 | 200 | ◎ | X | X |
| C. Ex. 1-3 | PP/PE csf | 70 | 10.8 | PET single fibers | 30 | 10.5 | 60.1 | 145 | 260 | ○ | X | X |
| C. Ex. 1-4 | PP/PE csf | 70 | 10.8 | PP single fibers | 30 | 11.0 | 60.2 | 150 | 150 | ○ | X | X |

Ex.: Example
C. Ex.: Comparative Example
pbm: Parts by mass
csf: Core-sheath fibers The semipermeable membrane supports of Examples 1-1 to 1-9 are wet-laid nonwoven fabrics containing PP/PE core-sheath fibers and semipermeable membrane supports having a burst strength of 300 to 1,000 kPa. The semipermeable membrane supports of Comparative Examples 1-1 to 1-4 are semipermeable membrane supports having a burst strength of less than 300 kPa. When compared with the semipermeable membrane supports of Comparative Examples 1-1 to 1-4, the semipermeable membrane supports of Examples 1-1 to 1-9 were excellent in washing resistance since they had high burst strength.

Since the semipermeable membrane supports of Comparative Examples 1-1 and 1-2 had a content of the PP/PE core-sheath fibers of less than 40 mass % based on the total of all fibers, they had a burst strength of less than 300 kPa, low adhesion to the semipermeable membrane and low washing resistance.

When the semipermeable membrane supports of Examples 1-1 to 1-9 are compared with the semipermeable membrane support of Comparative Example 1-3, although the semipermeable membrane support of Comparative Example 1-3 which contained 30 parts by mass of the PET stretched single fibers and had a total content of all the polyolefin-based fibers including the PP/PE core-sheath fibers of less than 80 mass % based on the total of all fibers was excellent in the permeation of the semipermeable membrane due to low burst strength, it had low adhesion to the semipermeable membrane and low washing resistance.

When Example 1-2 is compared with Comparative Example 1-4, as the pressure of thermal calender rolls was low at 40 kN/m, Comparative Example 1-4 had low burst strength, low adhesion to the semipermeable membrane and low washing resistance.

When the semipermeable membrane supports of Examples 1-1, 1-2, 1-3, 1-7 and 1-8 are compared with one another, as the content of the PP/PE core-sheath fibers became higher, burst strength became higher and washing resistance became higher.

When the semipermeable membrane supports of Examples 1-1 to 1-9 are compared with one another, the semipermeable membrane supports of Examples 1-1, 1-4 and 1-6 all of which had a content of the PP/PE core-sheath fibers of 100 mass % based on the total of all fibers were superior to the other semipermeable membrane supports in adhesion to the semipermeable membrane.

When the semipermeable membrane supports of Examples 1-1 to 1-9 are compared with one another, the semipermeable membrane supports of Examples 1-1 to 1-8 in which all the fibers were olefin-based fibers were superior in washing resistance to the semipermeable membrane support of Example 1-9 which contained the PET stretched single fibers.

Present Invention <2>

Example 2-1

100 parts by mass of PP/PE core-sheath fibers (fineness of 0.8 dtex, fiber length of 5 mm) was disintegrated and dispersed in the water of a pulper and stirred to prepare uniform slurry for paper making. After this slurry for paper making was used to form laminated wet paper having a weight of each layer of 30 g/m² in terms of dry mass by using a combination machine having an inclined wire and a cylinder wire, the laminated wet paper was dried by hot pressing in such a manner that the semipermeable membrane coating surface came into contact with a Yankee drier having a surface temperature of 135° C. to obtain a sheet having a combination weight of 60 g/m².

The obtained sheet was hot pressed with a hot pressing apparatus having a first roll nip composed of two metal rolls (radius of 450 mm, elastic modulus of 21,000 kN/cm²) and a second roll nip composed of one metal roll (radius of 450 mm, elastic modulus of 21,000 kN/cm²) and one elastic roll all of which were arranged continuously as shown in FIG. 1 to obtain a semipermeable membrane support. In the second roll nip, the surface in contact with the upper metal roll was a surface formed by an inclined wire paper machine and made a non-coating surface.

Hot Pressing Conditions
First Roll Nip
  Surface temperatures of two metal rolls: 125° C.
  Nip pressure: 80 kN/m
Second Roll Nip
  Surface temperature of metal roll: 125° C.
  Nip pressure: 100 kN/m
  Processing speed: 30 m/min

Example 2-2

The wet sheet produced in Example 2-1 was hot pressed with a hot pressing apparatus having a first roll nip composed of one metal roll (radius of 450 mm, elastic modulus of 21,000 kN/cm²) and one elastic roll and a second roll nip composed of one metal roll (radius of 450 mm, elastic modulus 21,000 kN/cm²) and one elastic roll all of which were arranged continuously as shown in FIG. 2 to obtain a semipermeable membrane support. In the first roll nip, the surface in contact with the upper metal roll was a surface formed by an inclined wire paper machine and made a coating surface.

First Roll Nip
  Surface temperature of metal roll: 125° C.
  Nip pressure: 100 kN/m
Second Roll Nip
  Surface temperature of metal roll: 125° C.
  Nip pressure: 100 kN/m
  Processing speed: 30 m/min

Example 2-3

A semipermeable membrane support was obtained in the same manner as in Example 2-2 except that the processing speed was changed to 25 m/min, the nip pressures of the first and second roll nips were changed to 110 kN/m, and hot pressing was carried out twice.

Example 2-4

A sheet having a combination weight of 80 g/m² was obtained by changing the dry mass of each layer to 40 g/m² at the time of obtaining a sheet by a wet paper making method in Example 2-1.

The obtained sheet was hot pressed in the same manner as in Example 2-2 to obtain a semipermeable membrane support.

Example 2-5

A sheet having a combination weight of 90 g/m² was obtained by changing the dry mass of each layer to 45 g/m² at the time of obtaining a sheet by a wet paper making method in Example 2-1.

The obtained sheet was hot pressed in the same manner as in Example 2-2 to obtain a semipermeable membrane support.

Example 2-6

A semipermeable membrane support was obtained by hot pressing a sheet in the same manner as in Example 2-5 except that the processing speed was changed to 35 m/min and the surface temperatures of the metal rolls of the first and second roll nips were changed to 120° C.

Example 2-7

A semipermeable membrane support was obtained by hot pressing a sheet in the same manner as in Example 2-5 except that the surface temperatures of the metal rolls of the first and second roll nips were changed to 110° C. and the nip pressure was changed to 80 kN/m.

Example 2-8

A semipermeable membrane support was obtained by hot pressing a sheet in the same manner as in Example 2-7 except that the processing speed was changed to 40 m/min.

Example 2-9

A semipermeable membrane support was obtained by hot pressing a sheet in the same manner as in Example 2-2 except that the processing speed was changed to 35 m/min.

Example 2-10

A semipermeable membrane support was obtained in the same manner as in Example 2-4 except that hot pressing was carried out twice.

Example 2-11

A semipermeable membrane support was obtained by hot pressing a sheet in the same manner as in Example 2-4 except that the processing speed was changed to 25 m/min and the nip pressures of the first and second roll nips were changed to 110 kN/m.

Example 2-12

A semipermeable membrane support was obtained by hot pressing a sheet in the same manner as in Example 2-4 except that the processing speed was changed to 33 m/min.

Example 2-13

A semipermeable membrane support was obtained by hot pressing a sheet in the same manner as in Example 2-12 except that the processing speed was changed to 40 m/min.

Example 2-14

A semipermeable membrane support was obtained by hot pressing in the same manner as in Example 2-4 except that the processing speed was changed to 27 m/min and the nip pressures of the first and second roll nips were changed to 110 kN/m.

Example 2-15

A sheet having a combination weight of 55 g/m² was obtained by changing the dry mass of each layer to 27.5 g/m² at the time of obtaining a sheet by a wet paper making method in Example 2-1.
A semipermeable membrane support was obtained by hot pressing the obtained sheet in the same manner as in Example 2-2.

Example 2-16

A semipermeable membrane support was obtained in the same manner as in Example 2-4 except that the hot pressing method of Example 2-4 was changed to the hot pressing method of Example 2-1 and hot pressing was carried out twice.

Comparative Example 2-1

A semipermeable membrane support was obtained in such a manner that the surface in contact with the upper metal roll in the second roll nip was a surface made by an inclined wire paper machine and also coating surface when a sheet made by a wet paper making method was processed with a hot pressing apparatus in Example 2-1.

Comparative Example 2-2

A semipermeable membrane support was obtained in such a manner that the surface in contact with the upper metal roll in the first roll nip was a surface made by an inclined wire paper machine and also coating surface when a sheet made by a wet paper making method was processed with a hot pressing apparatus in Example 2-2.

Comparative Example 2-3

A semipermeable membrane support was obtained in the same manner as in Comparative Example 2-2 when a sheet made by a wet paper making method was processed with a hot pressing apparatus in Example 2-4.

Comparative Example 2-4

A semipermeable membrane support was obtained in such a manner that the surface in contact with the upper metal roll in the second roll nip was a surface made by an inclined wire paper machine and also coating surface when a sheet made by a wet paper making method was processed with a hot pressing apparatus in Example 2-16.

The following measurements and evaluations were made on the semipermeable membrane supports obtained in Examples and Comparative Examples, and the results are shown in Table 2.

Measurement 2-1 (Bekk Smoothness)

The coating surface and the non-coating surface were measured in accordance with JIS P8119 by using a Bekk smoothness tester.

Measurement 2-2 (75° Mirror Surface Glossiness)

The 75° mirror surface glossiness was measured in accordance with JIS P8142 by using a glossiness tester (Gloss Meter VC7000 of Nippon Denshoku Industries Co., Ltd.). This measurement is made by matching the MD direction of the coating surface of a test piece with the incident direction of measurement light and then turning the test piece at 180°, and a two-digit significant figure obtained by a method specified in JIS Z8401 from an average value of the same measurement data on at least five test pieces is taken as the glossiness in the MD direction of the coating surface. A value obtained by the same measurement on the non-coating surfaces of test pieces is taken as the glossiness in the MD direction of the non-coating surface. The measurement is also made by matching the CD direction of the coating surface of a test piece with the incident light of measurement light and turning the test piece at 180°, and a two-digit significant figure obtained by a method specified in JIS Z8401 from an average value of the same measurement data on at least five test pieces is taken as the glossiness in the MD direction of the coating surface. In this measurement, the MD direction is a direction parallel to a flow direction at the time of making a sheet by using a paper machine and the CD direction is a direction perpendicular to the flow direction.

Measurement 2-3 (Weight)

The weight was measured in accordance with JIS P8124.

Measurement 2-4 (Thickness)

The thickness was measured in accordance with JIS P8118.

Measurement 2-5 (Air Permeability)

This was measured by a method specified in JIS L1096 using an air permeability tester (KATO TECH CO., LTD., trade name: KES-F8-AP1).

Evaluation 2-1 (Permeation of Semipermeable Membrane)

A comma coater having a predetermined clearance was used to apply a DMF solution (concentration of 21%) of polysulfone resin (manufactured by SOLVAY, trade name: Udel (registered trademark) P-3500 LCD MB3, molecular weight of 78,000 to 84,000 g/mol) to the coating surface of a semipermeable membrane support, and rinsing and drying were carried out to form a polysulfone membrane (semipermeable membrane) on the surface of the semipermeable membrane support so as to obtain a filtration membrane. A SEM photo of the cross section of the filtration membrane was taken to evaluate the degree of permeation of the polysulfone resin into the semipermeable membrane support.

◎: sulfone resin permeates only in an area near the center of semipermeable membrane support. Extremely high level.

○: polysulfone resin does not ooze out to the non-coating surface of semipermeable membrane support. High level.

Δ: polysulfone resin partially oozes out to the non-coating surface of semipermeable membrane support. Practically usable level.

χ: polysulfone resin oozes out to the non-coating surface of semipermeable membrane support. Practically unusable level.

Evaluation 2-2 (Adhesion to Semipermeable Membrane)

One day after manufacture, the semipermeable membrane manufactured in Evaluation 2-1 was separated from the semipermeable membrane support slowly at the interface between them to judge "adhesion to semipermeable membrane" by the degree of resistance at the time of separation.

◎: adhesion between semipermeable membrane and semipermeable membrane support is so high that they cannot be separated. Extremely high level.

○: there is a part where they are easily separated. High level.

Δ: although semipermeable membrane and semipermeable membrane support are bonded to each other, they are easily separated as a whole. Practically, lower limit level.

χ: separation occurs in rinsing or drying step after coating of semipermeable membrane. Unusable level.

Evaluation 2-3 (Adhesion to Resin Frame)

The semipermeable membrane support on which the semipermeable membrane obtained in evaluation 2-1 was coated was mounted to a resin frame made of ABS resin in such a matter that the non-coating surface was opposed to the resin frame, and a heat sealer heated at 200° C. was brought into contact with the semiconductor membrane coated side of the semipermeable membrane support for 2 seconds to heat bond them together. One day after heat bonding, the semipermeable membrane support and the resin frame were separated from each other slowly at the interface between them to judge "adhesion to resin frame" by the degree of resistance at the time of separation.

◎: adhesion between semipermeable membrane support and resin frame is so high that they cannot be separated. Extremely high level.

○: there is a part where they are easily separated. High level.

Δ: there is no problem with adhesion between semipermeable membrane support and resin frame but cracks in semipermeable membrane and drop-off of semipermeable membrane from semipermeable membrane support are observed.

Δχ: adhesion between semipermeable membrane support and resin frame is low and they are easily separated as a whole. Practically, lower limit level.

χ: they are easily separated. Or, semipermeable membrane support and resin frame are bonded to each other but cracks in semipermeable membrane and drop-off from semipermeable membrane support are markedly observed. Unusable level.

TABLE 2

| | Bekk smoothness sec. | | | 75° mirror surface glossiness % | | | | | | | | |
| | | | | Coating surface | | non-coating surface | | | test 2 Thickness | air permeability cc/cm² · | evaluation 1 Permiation of semipermeable | evaluation 2 Adhesion to semipermeable | evaluation 3 Adhesion to resin |
| | Coating surface | non-coating surface | Coating surface/non-coating | Coating surface MD | CD | non-coating surface MD | surface/coating surface (MD) | test 1 Weight g/m² | μm | sec | membrane | membrane | frame |
| --- | --- | --- | --- | --- | --- | --- | --- | --- | --- | --- | --- | --- | --- |
| Ex. 2-1 | 21 | 16 | 1.3 | 23 | 18 | 20 | 0.9 | 60 | 97 | 2.9 | ◎ | ◎ | ○ |
| Ex. 2-2 | 18 | 16 | 1.1 | 26 | 22 | 18 | 0.7 | 60 | 102 | 4.1 | ○ | Δ | ◎ |
| Ex. 2-3 | 51 | 37 | 1.4 | 30 | 25 | 28 | 0.9 | 60 | 89 | 1.6 | ○ | Δ | Δ |
| Ex. 2-4 | 8.0 | 6.0 | 1.3 | 24 | 20 | 21 | 0.9 | 80 | 157 | 3.5 | Δ | ○ | ○ |
| Ex. 2-5 | 4.0 | 3.6 | 1.1 | 22 | 19 | 18 | 0.8 | 90 | 190 | 4.2 | Δ | ◎ | ◎ |
| Ex. 2-6 | 3.2 | 2.4 | 1.3 | 13 | 10 | 12 | 0.9 | 90 | 197 | 5.3 | Δ | Δ | ◎ |
| Ex. 2-7 | 1.8 | 1.6 | 1.1 | 10 | 8 | 8 | 0.8 | 90 | 213 | 9.2 | Δ | Δ | ○ |
| Ex. 2-8 | 0.9 | 0.8 | 1.1 | 8 | 7 | 6 | 0.8 | 90 | 224 | 11.3 | Δ | Δ | Δ χ |
| Ex. 2-9 | 15 | 13 | 1.2 | 25 | 22 | 15 | 0.6 | 60 | 115 | 4.6 | ○ | ○ | Δ χ |
| Ex. 2-10 | 40 | 31 | 1.3 | 25 | 19 | 22 | 0.9 | 80 | 119 | 2.1 | ○ | ○ | ○ |
| Ex. 2-11 | 25 | 21 | 1.2 | 21 | 17 | 16 | 0.8 | 80 | 131 | 3.4 | ◎ | ◎ | ◎ |
| Ex. 2-12 | 6.6 | 5.9 | 1.1 | 22 | 19 | 19 | 0.9 | 80 | 158 | 4.1 | Δ | ◎ | ○ |
| Ex. 2-13 | 3.5 | 2.9 | 1.2 | 15 | 12 | 12 | 0.8 | 80 | 175 | 6.8 | Δ | ○ | ◎ |
| Ex. 2-14 | 11 | 10 | 1.2 | 22 | 17 | 19 | 0.9 | 80 | 150 | 1.9 | ○ | ◎ | ○ |

TABLE 2-continued

| | Bekk smoothness sec. | | | 75° mirror surface glossiness % | | | test 1 Weight | test 2 Thickness | air permeability | evaluation 1 Permiation of semipermeable | evaluation 2 Adhesion to semipermeable | evaluation 3 Adhesion to resin |
| | | | | Coating surface | | non-coating surface/ coating | | | | | | |
| | Coating surface | non-coating surface | Coating surface/ non-coating | MD | CD | MD | | | | | | |
| | | | | | | surface (MD) | g/m² | μm | cc/cm² · sec | membrane | membrane | frame |
|---|---|---|---|---|---|---|---|---|---|---|---|---|
| Ex. 2-15 | 10 | 8.6 | 1.2 | 20 | 18 | 18 | 0.9 | 55 | 106 | 8.2 | ○ | ◎ | ○ |
| Ex. 2-16 | 120 | 49 | 2.4 | 34 | 32 | 31 | 0.9 | 80 | 123 | 0.9 | ◎ | Δ | Δ X |
| C. Ex. 2-1 | 16 | 21 | 0.8 | 20 | 17 | 23 | 1.2 | 60 | 97 | 2.9 | X | ○ | Δ X |
| C. Ex. 2-2 | 16 | 18 | 0.9 | 18 | 16 | 26 | 1.4 | 60 | 102 | 4.1 | X | Δ | X |
| C. Ex. 2-3 | 6.0 | 8.0 | 0.8 | 21 | 18 | 24 | 1.1 | 80 | 157 | 3.5 | X | ○ | Δ X |
| C. Ex. 2-4 | 49 | 120 | 0.4 | 31 | 26 | 34 | 1.1 | 80 | 123 | 0.9 | ◎ | X | X |

Ex.: Example
C. Ex.: Comparative Example

The semipermeable membrane supports of Examples 2-1 to 2-16 are wet-laid nonwoven fabrics containing PP/PE core-sheath fibers and semipermeable membrane supports having a coating surface with a higher Bekk smoothness and 75° mirror surface glossiness than those of the non-coating surface and achieved high levels in the evaluations of the permeation of the semipermeable membrane, adhesion to the semipermeable membrane and adhesion to the resin frame.

In contrast to this, the semipermeable membrane supports of Comparative Examples 2-1 to 2-3 are wet-laid nonwoven fabrics containing PP/PE core-sheath fibers and semipermeable membrane supports having a coating surface with a lower Bekk smoothness and 75° mirror surface glossiness than those of the non-coating surface and had an unusable level or practically lower limit level in the evaluations of the permeation of the semipermeable membrane and adhesion to the resin frame though adhesion to the semipermeable membrane was satisfactory.

The semipermeable membrane support of Comparative Example 2-4 is a wet-laid nonwoven fabric containing PP/PE core-sheath fibers and semipermeable membrane support having a coating surface with a lower Bekk smoothness and 75° mirror surface glossiness than those of the non-coating surface and had an unusable level in the evaluations of adhesion to the semipermeable membrane and adhesion to the resin frame.

The semipermeable membrane supports of Examples 2-1, 2-2, 2-4 to 2-7 and 2-9 to 2-15 in which the Bekk smoothness of the coating surface was 1.0 to 51.0 sec. and the ratio of the Bekk smoothness of the coating surface to that of the non-coating surface was 1.3:1.0 to 1.1:1.0 was superior in at least one of adhesion to the semipermeable member and adhesion to the resin frame to the semipermeable membrane support of Example 2-3 in which the ratio of the Bekk smoothness of the coating surface to that of the non-coating surface was 1.4:1.0, the semipermeable membrane support of Example 2-8 in which the Bekk smoothness of the coating surface was 0.9 sec. and the semipermeable membrane support of Example 2-16 in which the Bekk smoothness of the coating surface was 120 sec. and the ratio of the Bekk smoothness of the coating surface to that of the non-coating surface was 2.4.

The semipermeable membrane supports of Example 2-1 to 2-7 and 2-10 to 2-15 in which the 75° mirror surface glossiness in the MD direction of the coating surface was 10 to 30%, the 75° mirror surface glossiness in the CD direction was 8 to 25% and the ratio of glossiness in the MD direction of the coating surface to that of the non-coating surface was 1.0:0.9 to 1.0:0.7 was superior in adhesion to the resin frame to Example 2-8 in which the 75° mirror surface glossiness in the MD direction of the coating surface was 8% and the 75° mirror surface glossiness in the CD direction was 7%, Example 2-9 in which the ratio of glossiness in the MD direction of the coating surface to that of the non-coating surface was 1.0:0.6 and Example 2-16 in which the 75° mirror surface glossiness in the MD direction of the coating surface was 34% and the 75° mirror surface glossiness in the CD direction was 32%.

Present Invention <5>

Example 5-1

100 parts by mass of core-sheath type conjugate fibers (sectional area ratio (β/α)=50/50, fineness of 0.8 dtex, fiber length of 5 mm)) composed of polypropylene (melting point of 165° C.) as a core component and polyethylene (melting point of 135° C.) as a sheath component was disintegrated and dispersed in the water of a pulper and gently stirred with an agitator to prepare uniform slurry for paper making. After this slurry for paper making was used to form laminated wet paper having a total weight of 60 g/m² in terms of dry mass by using a combination machine having an inclined wire paper machine and a cylinder paper machine, it was dried by hot pressing in such a manner that it came into contact with a Yankee drier having a surface temperature of 130° C. The obtained sheet was hot pressed at a metal roll temperature of 100° C., a pressure of 100 kN/m and a processing speed of 40 m/min by using a combination calender apparatus having a metal roll (heating) and a resin roll (non-heating) in such a manner that the coating surface came into contact with the metal roll to obtain a semipermeable membrane support.

Example 5-2

A semipermeable membrane support was obtained in the same manner as in Example 5-1 except that the cross-sectional area ratio (β/α) of the PP/PE core-sheath fiber was 70/30.

Example 5-3

A semipermeable membrane support was obtained in the same manner as in Example 5-1 except that the cross-sectional area ratio (β/α) of the PP/PE core-sheath fiber was 90/10.

Example 5-4

A semipermeable membrane support was obtained in the same manner as in Example 5-1 except that the cross-sectional area ratio (β/α) of the PP/PE core-sheath fiber was 60/40.

Example 5-5

A semipermeable membrane support was obtained in the same manner as in Example 5-1 except that the cross-sectional area ratio (β/α) of the PP/PE core-sheath fiber was 80/20.

Example 5-6

A semipermeable membrane support was obtained in the same manner as in Example 5-1 except that 80 parts by mass of PP/PE core-sheath fibers (cross-sectional area ratio (β/α) =50/50, fineness of 0.8 dtex, fiber length of 5 mm) and 20 parts by mass of polypropylene main fibers (fineness of 0.6 dtex, fiber length of 5 mm) were used.

Example 5-7

A semipermeable membrane support was obtained in the same manner as in Example 5-1 except that 60 parts by mass of PP/PE core-sheath fibers (β/α=50/50, fineness of 0.8 dtex, fiber length of 5 mm) and 40 parts by mass of polypropylene main fibers (fineness of 0.6 dtex, fiber length of 5 mm) were used.

Example 5-8

A semipermeable membrane support was obtained in the same manner as in Example 5-1 except that 60 parts by mass of PP/PE core-sheath fibers (β/α=50/50, fineness of 0.8 dtex, fiber length of 5 mm), 10 parts by mass of PP/PE core-sheath fibers (β/α=45/55, fineness of 0.8 dtex, fiber length of 5 mm) and 30 parts by mass of polypropylene main fibers (fineness of 0.6 dtex, fiber length of 5 mm) were used.

Example 5-9

A semipermeable membrane support was obtained in the same manner as in Example 5-1 except that 55 parts by mass of PP/PE core-sheath conjugate fibers (β/α=50/50, fineness of 0.8 dtex, fiber length of 5 mm) composed of polypropylene as a core component and polyethylene as a sheath component and 45 parts by mass of polypropylene main fibers (fineness of 0.6 dtex, fiber length of 5 mm) were used.

Comparative Example 5-1

A semipermeable membrane support was obtained in the same manner as in Example 5-1 except that the cross-sectional area ratio (β/α) of the PP/PE core-sheath fiber was 95/5.

Comparative Example 5-2

A semipermeable membrane support was obtained in the same manner as in Example 5-1 except that the cross-sectional area ratio (β/α) of the PP/PE core-sheath fiber was 45/55.

The following measurements and evaluations were made on the semipermeable membrane supports obtained in Examples and Comparative Examples, and the results are shown in Table 3.

Measurement 5-1 (Thickness)

The thickness was measured in accordance with JIS P8118.

Measurement 5-2 (Air Permeability)

This was measured in accordance with JIS L1096 with an air permeability meter (KES-F8-AP1: KATO TECH CO., LTD.).

Measurement 5-3 (Tensile Strength)

Tensile strength in the flow direction of each semipermeable membrane support after hot pressing was measured in accordance with JIS P8113. When it is not lower than 3 kN/m, there is no practical problem and when it is not lower than 4 kN/m, tensile strength is satisfactory.

Evaluation 5-1 (Permeation of Semipermeable Membrane)

A comma coater having a predetermined clearance was used to apply a DMF solution (concentration of 22%) of polysulfone resin (manufactured by SOLVAY, trade name: Udel (registered trademark) P-3500 LCD MB3, molecular weight of 78,000 to 84,000 g/mol) to the coating surface of a semipermeable membrane support, and rinsing and drying were carried out to form a polysulfone membrane (semipermeable membrane) on the surface of the semipermeable membrane support so as to obtain a filtration membrane. A SEM photo of the cross section of the filtration membrane was taken to evaluate the degree of permeation of the polysulfone resin into the semipermeable membrane support.

◎: sulfone resin permeates only in an area near the center of semipermeable membrane support. Extremely high level.

○: polysulfone resin does not ooze out to the non-coating surface of semipermeable membrane support. High level.

Δ: polysulfone resin partially oozes out to the non-coating surface of semipermeable membrane support. Practically usable level.

χ: polysulfone resin oozes out to the non-coating surface of semipermeable membrane support. Practically unusable level.

Evaluation 5-2 (Adhesion to Semipermeable Membrane)

Adhesion between the semipermeable membrane support and the semipermeable membrane in the filtration membrane manufactured in Evaluation 5-1 was evaluated. One day after the manufacture of the filtration membrane, the semipermeable membrane and the semipermeable membrane support were separated from each other slowly at the interface between them to judge "adhesion to semipermeable membrane" by the degree of resistance at the time of separation.

◎: adhesion between semipermeable membrane and semipermeable membrane support is so high that they cannot be separated. Extremely high level.

○: there is a part where they are easily separated. High level

Δ: although semipermeable membrane and semipermeable membrane support are bonded to each other, they are easily separated as a whole. Practically, lower limit level.

χ: separation occurs in rinsing or drying step after coating of semipermeable membrane. Unusable level.

Evaluation 5-3 (Adhesion to Frame Material)

The filtration membrane obtained in Evaluation 5-1 was mounted to a frame material made of ABS resin in such a matter that the non-coating surface came into contact with the frame material, and a heat sealer heated at 200° C. was applied to the semiconductor membrane side for 3 seconds to heat bond them together. One day after heat bonding, the semipermeable membrane and the frame material were separated from each other slowly at the interface between them to judge "adhesion to frame material" by the degree of resistance at the time of separation.

⊙: adhesion between semipermeable membrane support and frame material is so high that they cannot be separated. Extremely high level.

○: there is a part where they are easily separated. High level.

Δ: although semipermeable membrane support and frame material are bonded to each other, they are easily separated as a whole. Or, there is no problem with adhesion between semipermeable membrane support and frame material but cracks in semipermeable membrane and drop-off of semipermeable membrane from semipermeable membrane support are observed. Practically, lower limit level.

χ: they are easily separated. Or, filtration membrane and frame material are bonded to each other but cracks in semipermeable membrane and drop-off of semipermeable membrane from semipermeable membrane support are observed. Unusable level.

parative Example 5-2, the semipermeable membrane hardly permeated and adhesion between the semipermeable membrane support and the semipermeable membrane was low.

When the semipermeable membrane supports of Examples 5-1 to 5-5 are compared with one another, in the semipermeable membrane supports of Examples 5-2 and 5-4 which contained PP/PE core-sheath fibers having a cross-sectional area ratio (β/α) of 60/40 to 75/25, the semipermeable membrane permeated only into an area near the center of the semipermeable membrane support and adhesion between the semipermeable membrane support and the semipermeable membrane was high as compared with the semipermeable membrane supports of Examples 5-1, 5-3 and 5-5.

When the semipermeable membrane supports of Examples 5-1, 5-6, 5-7 and 5-9 are compared with one another, in the semipermeable membrane supports of Examples 5-1, 5-6 and 5-7 which had a content of PP/PE core-sheath fibers having a cross-sectional area ratio (β/α) of more than 45/55 to not more than 90/10 of 60 to 100 mass %, the semipermeable membranes did not ooze out to the non-coating surface and adhesion to the frame material was

TABLE 3

| | Cross-sectional area ratio of csf β/α | | Fiber content (based on mass) | | Thickness | Air permeability | Tensile strength | Permeation of semipermeable | Adhesion to semipermeable | Adhesion to frame |
|---|---|---|---|---|---|---|---|---|---|---|
| | PP | PE | PP/PE | PP | μm | cm³/cm² · sec | N/m | membrane | membrane | material |
| Ex. 5-1 | 50 | 50 | 100 | | 94 | 3.5 | 4233 | ⊙ | ○ | ⊙ |
| Ex. 5-2 | 70 | 30 | 100 | | 100 | 5.1 | 4583 | ⊙ | ⊙ | ⊙ |
| Ex. 5-3 | 90 | 10 | 100 | | 104 | 6.2 | 4128 | ○ | ⊙ | ⊙ |
| Ex. 5-4 | 60 | 40 | 100 | | 101 | 4.6 | 4358 | ⊙ | ⊙ | ⊙ |
| Ex. 5-5 | 80 | 20 | 100 | | 103 | 5.7 | 4322 | ○ | ⊙ | ⊙ |
| Ex. 5-6 | 50 | 50 | 80 | 20 | 123 | 5.8 | 5327 | ⊙ | ○ | ⊙ |
| Ex. 5-7 | 50 | 50 | 60 | 40 | 128 | 7.5 | 4587 | ○ | ⊙ | ○ |
| Ex. 5-8 | 50 | 50 | 60 | 30 | 125 | 6.8 | 4852 | ○ | ⊙ | ○ |
| | 45 | 55 | 10 | | | | | | | |
| Ex. 5-9 | 50 | 50 | 55 | 45 | 135 | 10.5 | 3487 | Δ | ⊙ | Δ |
| C. Ex. 5-1 | 95 | 5 | 100 | | 134 | 10.8 | 2837 | X | ⊙ | X |
| C. Ex. 5-2 | 45 | 55 | 100 | | 90 | 1.2 | 3846 | ⊙ | X | ⊙ |

Ex.: Example
C. Ex.: Comparative Example
csf: core-sheath fibers

The semipermeable membrane supports of Examples 5-1 to 5-9 are polyolefin-based semipermeable membrane supports containing PP/PE core-sheath fibers having a cross-sectional area ratio (β/α) of more than 45/55 to not more than 90/10. The semipermeable membrane support of Comparative Example 5-1 is a polyolefin-based semipermeable membrane support containing PP/PE core-sheath fibers having a cross-sectional area ratio (β/α) of more than 90/10. The semipermeable membrane support of Comparative Example 5-2 is a polyolefin-based semipermeable membrane support containing PP/PE core-sheath fibers having a cross-sectional area ratio (β/α) of 45/55. In the semipermeable membrane supports of Examples 5-1 to 5-9, the semipermeable membrane permeated into the semipermeable membrane support but did not ooze out to the non-coating surface and strike-through hardly occurred though adhesion between the semipermeable membrane support and the semipermeable membrane was high. Further, they had excellent adhesion to the frame material. In contrast to this, in the semipermeable membrane support of Comparative Example 5-1, the semipermeable membrane oozed out to the non-coating surface, strike-through occurred, and adhesion to the frame material was low. In the semipermeable membrane support of Comparative excellent as compared with the semipermeable membrane support of Example 5-9 having a content of the above PP/PE core-sheath fibers of 55 mass %.

Although the semipermeable membrane support of Example 5-8 contained PP/PE core-sheath fibers having a cross-sectional area ratio (β/α) of more than 45/55 to not more than 90/10 and PP/PE core-sheath fibers having a cross-sectional area ratio (β/α) of 45/55, the semipermeable membrane permeated into the semipermeable membrane support but did not ooze out to the non-coating surface and strike-through hardly occurred though adhesion between the semipermeable membrane support and the semipermeable membrane was high. Adhesion to the frame material was also high.

Present Invention <8>

Example 8-1

100 parts by mass of PP/PE core-sheath fibers (average fiber length of 9.2 μm, fiber length of 5 mm) was disintegrated and dispersed in the water of a pulper and stirred gently with an agitator to prepare uniform slurry for paper making. The melting point of PP of the PP/PE core-sheath fiber was 165° C. and the melting point of polyethylene was 135° C. After laminated wet paper having a total weight of 60 g/m² in terms of dry mass was formed by using a combination machine having an inclined wire paper machine and a cylinder paper machine, it was dried by hot pressing in such a manner that it came into contact with a Yankee drier having a surface temperature of 133° C. to obtain a sheet. The obtained sheet was hot pressed at a metal roll temperature of 100° C., a pressure of 100 kN/m and a processing speed of 40 m/min by using a calender apparatus having a combination of a metal roll (heating) and a resin roll (non-heating) in such a manner that the coating surface came into contact with the metal roll to obtain a semipermeable membrane support.

Example 8-2

A semipermeable membrane support was obtained in the same manner as in Example 8-1 except that 100 parts by mass of PP/PE core-sheath fibers (average fiber diameter of 9.5 μm, fiber length of 5 mm) was used.

Example 8-3

A semipermeable membrane support was obtained in the same manner as in Example 8-1 except that 100 parts by mass of PP/PE core-sheath fibers (average fiber diameter of 12.1 μm, fiber length of 5 mm) was used.

Example 8-4

A semipermeable membrane support was obtained in the same manner as in Example 8-1 except that 100 parts by mass of PP/PE core-sheath fibers (average fiber diameter of 13.9 μm, fiber length of 5 mm) was used.

Example 8-5

A semipermeable membrane support was obtained in the same manner as in Example 8-1 except that 70 parts by mass of PP/PE core-sheath fibers (average fiber diameter of 10.3 μm, fiber length of 5 mm) and 30 parts by mass of PP/PE core-sheath fibers (average fiber diameter of 13.9 μm, fiber length of 5 mm) were used.

Example 8-6

A semipermeable membrane support was obtained in the same manner as in Example 8-1 except that 70 parts by mass of PP/PE core-sheath fibers (average fiber diameter of 9.5 μm, fiber length of 5 mm) and 30 parts by mass of PP/PE core-sheath fibers (average fiber diameter of 14.1 μm, fiber length of 5 mm) were used.

Example 8-7

A semipermeable membrane support was obtained in the same manner as in Example 8-1 except that 70 parts by mass of PP/PE core-sheath fibers (average fiber diameter of 9.2 μm, fiber length of 5 mm) and 30 parts by mass of PP/PE core-sheath fibers (average fiber diameter of 12.0 μm, fiber length of 5 mm) were used.

Example 8-8

A semipermeable membrane support was obtained in the same manner as in Example 8-1 except that 70 parts by mass of PP/PE core-sheath fibers (average fiber diameter of 10.5 μm, fiber length of 5 mm) and 30 parts by mass of PP/PE core-sheath fibers (average fiber diameter of 14.8 μm, fiber length of 5 mm) were used.

Example 8-9

A semipermeable membrane support was obtained in the same manner as in Example 8-1 except that 70 parts by mass of PP/PE core-sheath fibers (average fiber diameter of 10.5 μm, fiber length of 5 mm) and 30 parts by mass of PP/PE core-sheath fibers (average fiber diameter of 12.1 μm, fiber length of 5 mm) were used.

Example 8-10

A semipermeable membrane support was obtained in the same manner as in Example 8-1 except that 90 parts by mass of PP/PE core-sheath fibers (average fiber diameter of 10.3 μm, fiber length of 5 mm) and 10 parts by mass of PP/PE core-sheath fibers (average fiber diameter of 13.9 μm, fiber length of 5 mm) were used.

Example 8-11

A semipermeable membrane support was obtained in the same manner as in Example 8-1 except that 50 parts by mass of PP/PE core-sheath fibers (average fiber diameter of 10.3 μm, fiber length of 5 mm) and 50 parts by mass of PP/PE core-sheath fibers (average fiber diameter of 13.9 μm, fiber length of 5 mm) were used.

Example 8-12

A semipermeable membrane support was obtained in the same manner as in Example 8-1 except that 70 parts by mass of PP/PE core-sheath fibers (average fiber diameter of 13.9 μm, fiber length of 5 mm) and 30 parts by mass of PP/PE core-sheath fibers (average fiber diameter of 16.1 μm, fiber length of 5 mm) were used.

Example 8-13

A semipermeable membrane support was obtained in the same manner as in Example 8-1 except that 90 parts by mass of PP/PE core-sheath fibers (average fiber diameter of 13.9 μm, fiber length of 5 mm) and 10 parts by mass of PP/PE core-sheath fibers (average fiber diameter of 16.1 μm, fiber length of 5 mm) were used.

Example 8-14

A semipermeable membrane support was obtained in the same manner as in Example 8-1 except that 40 parts by mass of PP/PE core-sheath fibers (average fiber diameter of 10.3 μm, fiber length of 5 mm) and 60 parts by mass of PP/PE core-sheath fibers (average fiber diameter of 16.1 μm, fiber length of 5 mm) were used.

Example 8-15

A semipermeable membrane support was obtained in the same manner as in Example 8-1 except that 50 parts by mass of PP/PE core-sheath fibers (average fiber diameter of 10.3 μm, fiber length of 5 mm) and 50 parts by mass of PP/PE core-sheath fibers (average fiber diameter of 16.1 μm, fiber length of 5 mm) were used.

Example 8-16

A semipermeable membrane support was obtained in the same manner as in Example 8-1 except that 80 parts by mass of PP/PE core-sheath fibers (average fiber diameter of 10.3 μm, fiber length of 5 mm) and 20 parts by mass of PP/PE core-sheath fibers (average fiber diameter of 16.1 μm, fiber length of 5 mm) were used.

Example 8-17

A semipermeable membrane support was obtained in the same manner as in Example 8-1 except that 70 parts by mass of PP/PE core-sheath fibers (average fiber diameter of 10.3 μm, fiber length of 5 mm) and 30 parts by mass of PP/PE core-sheath fibers (average fiber diameter of 16.1 μm, fiber length of 5 mm) were used.

Example 8-18

A semipermeable membrane support was obtained in the same manner as in Example 8-1 except that 60 parts by mass of PP/PE core-sheath fibers (average fiber diameter of 10.3 μm, fiber length of 5 mm) and 40 parts by mass of PP/PE core-sheath fibers (average fiber diameter of 16.1 μm, fiber length of 5 mm) were used.

Example 8-19

A semipermeable membrane support was obtained in the same manner as in Example 8-1 except that 60 parts by mass of PP/PE core-sheath fibers (average fiber diameter of 9.5 μm, fiber length of 5 mm), 20 parts by mass of PP/PE core-sheath fibers (average fiber diameter of 13.9 μm, fiber length of 5 mm) and 20 parts by mass of PP/PE core-sheath fibers (average fiber diameter of 16.1 μm, fiber length of 5 mm) were used.

Example 8-20

A semipermeable membrane support was obtained in the same manner as in Example 8-1 except that 70 parts by mass of PP/PE core-sheath fibers (average fiber diameter of 9.5 μm, fiber length of 5 mm), 20 parts by mass of PP/PE core-sheath fibers (average fiber diameter of 13.9 μm, fiber length of 5 mm) and 10 parts by mass of PP/PE core-sheath fibers (average fiber diameter of 16.1 μm, fiber length of 5 mm) were used.

Example 8-21

A semipermeable membrane support was obtained in the same manner as in Example 8-1 except that 80 parts by mass of PP/PE core-sheath fibers (average fiber diameter of 9.5 μm, fiber length of 5 mm), 10 parts by mass of PP/PE core-sheath fibers (average fiber diameter of 13.9 μm, fiber length of 5 mm) and 10 parts by mass of PP/PE core-sheath fibers (average fiber diameter of 16.1 μm, fiber length of 5 mm) were used.

Example 8-22

A semipermeable membrane support was obtained in the same manner as in Example 8-1 except that 40 parts by mass of PP/PE core-sheath fibers (average fiber diameter of 9.5 μm, fiber length of 5 mm), 30 parts by mass of PP/PE core-sheath fibers (average fiber diameter of 13.9 μm, fiber length of 5 mm) and 30 parts by mass of PP/PE core-sheath fibers (average fiber diameter of 16.1 μm, fiber length of 5 mm) were used.

Comparative Example 8-1

A semipermeable membrane support was obtained in the same manner as in Example 8-1 except that 50 parts by mass of PP/PE core-sheath fibers (average fiber diameter of 8.3 μm, fiber length of 5 mm), 20 parts by mass of PP/PE core-sheath fibers (average fiber diameter of 13.9 μm, fiber length of 5 mm) and 30 parts by mass of polypropylene fibers (average fiber diameter of 22.0 μm, fiber length of 5 mm) were used.

Comparative Example 8-2

A semipermeable membrane support was obtained in the same manner as in Example 8-1 except that 50 parts by mass of PP/PE core-sheath fibers (average fiber diameter of 8.3 μm, fiber length of 5 mm), 20 parts by mass of PP/PE core-sheath fibers (average fiber diameter of 13.9 μm, fiber length of 5 mm) and 30 parts by mass of polypropylene fibers (average fiber diameter of 22.0 μm, fiber length of 10 mm) were used.

Comparative Example 8-3

A semipermeable membrane support was obtained in the same manner as in Example 8-1 except that 70 parts by mass of PP/PE core-sheath fibers (average fiber diameter of 8.3 μm, fiber length of 5 mm) and 30 parts by mass of PP/PE core-sheath fibers (average fiber diameter of 13.9 μm, fiber length of 5 mm) were used.

Comparative Example 8-4

A semipermeable membrane support was obtained in the same manner as in Example 8-1 except that 70 parts by mass of PP/PE core-sheath fibers (average fiber diameter of 8.3 μm, fiber length of 5 mm) and 30 parts by mass of polypropylene fibers (average fiber diameter of 22.0 μm, fiber length of 10 mm) were used.

Comparative Example 8-5

A semipermeable membrane support was obtained in the same manner as in Example 8-1 except that 40 parts by mass of PP/PE core-sheath fibers (average fiber diameter of 10.3 μm, fiber length of 5 mm) and 60 parts by mass of PP/PE core-sheath fibers (average fiber diameter of 13.9 μm, fiber length of 5 mm) were used.

Comparative Example 8-6

A semipermeable membrane support was obtained in the same manner as in Example 8-1 except that 30 parts by mass of PP/PE core-sheath fibers (average fiber diameter of 10.3 μm, fiber length of 5 mm) and 70 parts by mass of PP/PE core-sheath fibers (average fiber diameter of 16.1 μm, fiber length of 5 mm) were used.

Comparative Example 8-7

A semipermeable membrane support was obtained in the same manner as in Example 8-1 except that 90 parts by mass of PP/PE core-sheath fibers (average fiber diameter of 10.3

μm, fiber length of 5 mm) and 10 parts by mass of PP/PE core-sheath fibers (average fiber diameter of 16.1 μm, fiber length of 5 mm) were used.

Comparative Example 8-8

A semipermeable membrane support was obtained in the same manner as in Example 8-1 except that 60 parts by mass of PP/PE core-sheath fibers (average fiber diameter of 13.9 μm, fiber length of 5 mm) and 40 parts by mass of PP/PE core-sheath fibers (average fiber diameter of 16.1 μm, fiber length of 5 mm) were used.

Comparative Example 8-9

A semipermeable membrane support was obtained in the same manner as in Example 8-1 except that 30 parts by mass of PP/PE core-sheath fibers (average fiber diameter of 9.5 μm, fiber length of 5 mm), 40 parts by mass of PP/PE core-sheath fibers (average fiber diameter of 13.9 μm, fiber length of 5 mm) and 30 parts by mass of PP/PE core-sheath fibers (average fiber diameter of 16.1 μm, fiber length of 5 mm) were used.

The following measurements and evaluations were made on the semipermeable membrane supports obtained in Examples and Comparative Examples, and the results are shown in Table 4.

Measurement 8-1 (Average Fiber Diameter)

As for the average fiber diameter of fibers constituting a nonwoven fabric, the cross sections of the fibers were observed through a microscope to calculate the cross-sectional areas of 50 or more fibers selected at random with image analyzing software and convert them into fiber diameters as measurement data.

Measurement 8-2 (Thickness)

The thickness was measured in accordance with JIS P8118.

Evaluation 8-1 (Permeation of Semipermeable Membrane)

A comma coater having a predetermined clearance was used to apply a DMF solution (concentration of 22%) of polysulfone resin (manufactured by SOLVAY, trade name: Udel (registered trademark) P-3500 LCD MB3, molecular weight of 78,000 to 84,000 g/mol) to the coating surface of a semipermeable membrane support, and rinsing and drying were carried out to form a polysulfone membrane (semipermeable membrane) on the surface of the semipermeable membrane support so as to obtain a filtration membrane. A SEM photo of the cross section of the filtration membrane was taken to evaluate the degree of permeation of the polysulfone resin into the semipermeable membrane support.

◉: sulfone resin permeates only in an area near the center of semipermeable membrane support. Extremely high level.
○: polysulfone resin does not ooze out to the non-coating surface of semipermeable membrane support. High level.
Δ: polysulfone resin partially oozes out to the non-coating surface of semipermeable membrane support. Practically, usable level.
χ: polysulfone resin oozes out to the non-coating surface of semipermeable membrane support. Practically, unusable level.

Evaluation 8-2 (Adhesion to Semipermeable Membrane)

Adhesion between the semipermeable membrane support and the semipermeable membrane in the filtration membrane manufactured in Evaluation 8-1 was evaluated. One day after the manufacture of the filtration membrane, the semipermeable membrane and the semipermeable membrane support were separated from each other slowly at the interface between them to judge "adhesion to semipermeable membrane" by the degree of resistance at the time of separation.

◉: adhesion between semipermeable membrane and semipermeable membrane support is so high that they cannot be separated. Extremely high level.
○: there is a part where they are easily separated. High level
Δ: although semipermeable membrane and semipermeable membrane support are bonded to each other, they are easily separated as a whole. Practically, lower limit level.
χ: separation occurs in rinsing or drying step after coating of semipermeable membrane. Unusable level Evaluation 8-3 (Adhesion to Frame Material)

The filtration membrane obtained in Evaluation 8-1 was mounted to a frame material made of ABS resin in such a matter that the non-coating surface came into contact with the frame material, and a heat sealer heated at 200° C. was applied to the semiconductor membrane side for 3 seconds to heat bond them together. One day after heat bonding, the semipermeable membrane and the frame material were separated from each other slowly at the interface between them to judge "adhesion to frame material" by the degree of resistance at the time of separation.

◉: adhesion between semipermeable membrane support and frame material is so high that they cannot be separated. Extremely high level.
○: there is a part where they are easily separated. High level.
Δ: although semipermeable membrane support and frame material are bonded to each other, they are easily separated as a whole. Or, there is no problem with adhesion between semipermeable membrane support and frame material but cracks in semipermeable membrane and drop-off of semipermeable membrane from semipermeable membrane support are observed. Practically, lower limit level.
χ: they are easily separated. Or, filtration membrane and frame material are bonded to each other but cracks in semipermeable membrane and drop-off of semipermeable membrane from semipermeable membrane support are observed. Unusable level.

TABLE 4

| | PP/PE core-sheath fibers | | | | | | PP fibers | | Average fiber diameter of all fibers (μm) | Thickness (μm) | Permeation of semipermeable membrane | Adhesion to semipermeable membrane | Adhesion to frame material |
|---|---|---|---|---|---|---|---|---|---|---|---|---|---|
| | Amount pbm | Average fiber diameter (μm) | Amount pbm | Average fiber diameter (μm) | Amount pbm | Average fiber diameter (μm) | Amount pbm | Average fiber diameter (μm) | | | | | |
| Ex. 8-1 | 100 | 9.2 | — | — | — | — | — | — | 9.2 | 98 | ○ | ○ | Δ |
| Ex. 8-2 | 100 | 9.5 | — | — | — | — | — | — | 9.5 | 98 | ◉ | ○ | Δ |

TABLE 4-continued

| | PP/PE core-sheath fibers | | | | | | PP fibers | | Average fiber diameter of all fibers (μm) | Thickness (μm) | Permeation of semipermeable membrane | Adhesion to semipermeable membrane | Adhesion to frame material |
|---|---|---|---|---|---|---|---|---|---|---|---|---|---|
| | Amount pbm | Average fiber diameter (μm) | Amount pbm | Average fiber diameter (μm) | Amount pbm | Average fiber diameter (μm) | Amount pbm | Average fiber diameter (μm) | | | | | |
| Ex. 8-3 | 100 | 12.1 | — | — | — | — | — | — | 12.1 | 101 | Δ | ◉ | ○ |
| Ex. 8-4 | 100 | 13.9 | — | — | — | — | — | — | 13.9 | 110 | Δ | ○ | ○ |
| Ex. 8-5 | 70 | 10.3 | 30 | 13.9 | — | — | — | — | 11.2 | 105 | ◉ | ◉ | ◉ |
| Ex. 8-6 | 70 | 9.5 | 30 | 14.1 | — | — | — | — | 10.6 | 108 | ◉ | ○ | ◉ |
| Ex. 8-7 | 70 | 9.2 | 30 | 12.0 | — | — | — | — | 10.0 | 100 | ◉ | ○ | ○ |
| Ex. 8-8 | 70 | 10.5 | 30 | 14.8 | — | — | — | — | 11.5 | 115 | ○ | ◉ | ◉ |
| Ex. 8-9 | 70 | 10.5 | 30 | 12.1 | — | — | — | — | 10.8 | 105 | ◉ | ◉ | ○ |
| Ex. 8-10 | 90 | 10.3 | 10 | 13.9 | — | — | — | — | 10.5 | 94 | ○ | Δ | ◉ |
| Ex. 8-11 | 50 | 10.3 | 50 | 13.9 | — | — | — | — | 11.8 | 100 | Δ | ◉ | ◉ |
| Ex. 8-12 | 70 | 13.9 | 30 | 16.1 | — | — | — | — | 14.6 | 121 | ○ | Δ | Δ |
| Ex. 8-13 | 90 | 13.9 | 10 | 16.1 | — | — | — | — | 14.1 | 117 | ○ | ○ | Δ |
| Ex. 8-14 | 40 | 10.3 | 60 | 16.1 | — | — | — | — | 14.0 | 101 | ○ | ○ | Δ |
| Ex. 8-15 | 50 | 10.3 | 50 | 16.1 | — | — | — | — | 13.4 | 97 | Δ | ○ | ○ |
| Ex. 8-16 | 80 | 10.3 | 20 | 16.1 | — | — | — | — | 11.5 | 91 | ○ | Δ | Δ |
| Ex. 8-17 | 70 | 10.3 | 30 | 16.1 | — | — | — | — | 12.3 | 90 | ○ | ○ | Δ |
| Ex. 8-18 | 60 | 10.3 | 40 | 16.1 | — | — | — | — | 12.8 | 95 | ○ | ○ | ○ |
| Ex. 8-19 | 60 | 9.5 | 20 | 13.9 | 20.0 | 16.1 | — | — | 11.7 | 108 | Δ | ○ | ○ |
| Ex. 8-20 | 70 | 9.5 | 20 | 13.9 | 10 | 16.1 | — | — | 11.0 | 104 | Δ | ○ | ◉ |
| Ex. 8-21 | 80 | 9.5 | 10 | 13.9 | 10 | 16.1 | — | — | 10.6 | 101 | ○ | Δ | ○ |
| Ex. 8-22 | 40 | 9.5 | 30 | 13.9 | 30 | 16.1 | — | — | 12.1 | 108 | Δ | ○ | Δ |
| C. Ex. 8-1 | 50 | 8.3 | 20 | 13.9 | — | — | 30 | 22.0 | 13.5 | 135 | X | ○ | X |
| C. Ex. 8-2 | 50 | 8.3 | 20 | 13.9 | — | — | 30 | 22.0 | 13.2 | 140 | X | ○ | X |
| C. Ex. 8-3 | 70 | 8.3 | 30 | 13.9 | — | — | — | — | 10.0 | 128 | Δ | X | ○ |
| C. Ex. 8-4 | 70 | 8.3 | — | — | — | — | 30 | 22.0 | 12.3 | 128 | X | Δ | X |
| C. Ex. 8-5 | 40 | 10.3 | 60 | 13.9 | — | — | — | — | 12.5 | 102 | X | ○ | ○ |
| C. Ex. 8-6 | 30 | 10.3 | 70 | 16.1 | — | — | — | — | 14.6 | 110 | Δ | Δ | X |
| C. Ex. 8-7 | 90 | 10.3 | 10 | 16.1 | — | — | — | — | 10.9 | 85 | X | X | Δ |
| C. Ex. 8-8 | 60 | 13.9 | 40 | 16.1 | — | — | — | — | 14.8 | 125 | Δ | X | X |
| C. Ex. 8-9 | 30 | 9.5 | 40 | 13.9 | 30 | 16.1 | — | — | 13.2 | 109 | X | Δ | X |

Ex.: Example
C. Ex.: Comparative Example
pbm: Parts by mass

The semipermeable membrane supports of Examples 8-1 to 8-22 contain at least one type of fibers selected from the group consisting of PP/PE core-sheath fibers A, PP/PE core-sheath fibers B and PP/PE core-sheath fibers C and at least one of the PP/PE core-sheath fibers A and the PP/PE core-sheath fibers B as an essential component. The content ratio (A/B) of a semipermeable membrane support containing the PP/PE core-sheath fibers A and the PP/PE core-sheath fibers B is 50/50 to 90/10 based on mass, the content ratio (A/C) of a semipermeable membrane support containing the PP/PE core-sheath fibers A and the PP/PE core-sheath fibers C is 40/60 to 80/20 based on mass, the content ratio (B/C) of a semipermeable membrane support containing the PP/PE core-sheath fibers B and the PP/PE core-sheath fibers C is 70/30 to 90/10 based on mass, and the content ratio (A/B/C) of a semipermeable membrane support containing the PP/PE core-sheath fibers A, the PP/PE core-sheath fibers B and the PP/PE core-sheath fibers C is 40/30/30 to 80/10/10 based on mass.

The semipermeable membrane support of Comparative Example 8-1 is a semipermeable membrane support containing no PP/PE core-sheath fibers A but containing the PP/PE core-sheath fibers B and polypropylene fibers having an average fiber diameter of 22.0 μm and a fiber length of 5 mm. The semipermeable membrane support of Comparative Example 8-2 is a semipermeable membrane support containing no PP/PE core-sheath fibers A but containing the PP/PE core-sheath fibers B and polypropylene fibers having an average fiber diameter of 22.0 μm and a fiber length of 10 mm.

In the semipermeable membrane supports of Examples 8-1 to 8-22, although the semipermeable membrane permeated into the semipermeable membrane support and adhesion between the semipermeable membrane support and the semipermeable membrane was excellent, the semipermeable membrane did not ooze out to the non-coating surface, and strike-through hardly occurred. They were excellent in adhesion to the frame material as well. In contrast to this, in the semipermeable membrane supports of Comparative Examples 8-1 and 8-2, the semipermeable membrane oozed out to the non-coating surface, strike-through occurred, and adhesion to the frame material was low.

When the semipermeable membrane supports of Examples 8-5 to 8-11 are compared with one another, the semipermeable membrane supports of Examples 8-5 to 8-9 having a content ratio (A/B) of the PP/PE core-sheath fibers A to the PP/PE core-sheath fibers B of 60/40 to 80/20 were superior to the semipermeable membrane supports of Examples 8-10 and 8-11 having a content ratio (A/B) outside the above range in balance between the permeation of the semipermeable membrane and adhesion to the semipermeable membrane. Since the semipermeable membrane support of Comparative Example 8-5 had a content ratio (A/B) of the PP/PE core-sheath fibers A to the PP/PE core-sheath fibers B outside the claimed range of 50/50 to 90/10, the permeation of the semipermeable membrane was bad.

When the semipermeable membrane supports of Examples 8-14 to 8-18 are compared with one another, the semipermeable membrane support of Example 8-18 having a content ratio (A/C) of the PP/PE core-sheath fibers A to the PP/PE core-sheath fibers C of 60/40 was superior to the semipermeable membrane supports of Examples 8-14 to 8-17 in balance among the permeation of the semipermeable membrane, adhesion to the semipermeable membrane and adhesion to the frame material. The semipermeable membrane supports of Examples 8-15, 8-17 and 8-18 having a content ratio (A/C) of 50/50 to 70/30 were superior to the semipermeable membrane supports of Examples 8-14 and 8-16 having a content (A/C) outside the above range in balance among the permeation of the semipermeable membrane, adhesion to the semipermeable membrane and adhesion to the frame material. Since the semipermeable membrane supports of Comparative Examples 8-6 and 8-7 had a content ratio (A/C) outside the claimed range of 40/60 to 80/20 based on mass, balance among the permeation of the semipermeable membrane, adhesion to the semipermeable membrane and adhesion to the frame material was bad.

When the semipermeable membrane supports of Examples 8-12 and 8-13 are compared with each other, the semipermeable membrane support of Example 8-13 having a content ratio (B/C) of the PP/PE core-sheath fibers B to the PP/PE core-sheath fibers C which falls within a range of 80/20 to 90/10 was superior to the semipermeable membrane support of Example 8-12 having a content ratio (B/C) outside the above range in adhesion to the semipermeable membrane. Since the semipermeable membrane support of Comparative Example 8-8 had a content ratio (B/C) outside the claimed range of 70/30 to 90/10 based on mass, it had low adhesion to the semipermeable membrane and low adhesion to the frame material.

When the semipermeable membrane supports of Examples 8-19 to 8-22 are compared with one another, the semipermeable membrane supports of Examples 8-19 to 8-21 having a content ratio (A/B/C) of the PP/PE core-sheath fibers A, the PP/PE core-sheath fibers B and the PP/PE core-sheath fibers C of 60/20/20 to 80/10/10 were superior to the semipermeable membrane support of Example 8-22 having a content ratio (A/B/C) outside the above range in balance among the permeation of the semipermeable membrane, adhesion to the semipermeable membrane and adhesion to the frame material. Since the semipermeable membrane support of Comparative Example 8-9 had a content ratio (A/B/C) outside the claimed range of 40/30/30 to 80/10/10 based on mass, the permeation of the semipermeable membrane and adhesion to the frame material were bad.

When the semipermeable membrane supports of Example 8-5 and Comparative Example 8-3 are compared with each other, the semipermeable membrane support of Comparative Example 8-3 containing PP/PE core-sheath fibers having a smaller fiber diameter than the PP/PE core-sheath fibers A was inferior in adhesion to the semipermeable membrane. The semipermeable membrane support of Comparative Example 8-4 containing PP/PE core-sheath fibers having a smaller fiber diameter than the PP/PE core-sheath fibers A and polypropylene fibers having an average fiber diameter of 22.0 μm and a fiber length of 10 mm was inferior in the permeation of the semipermeable membrane and adhesion to the frame material.

INDUSTRIAL FEASIBILITY

The semipermeable membrane support of the present invention can be used in fields such as the production of ultrapure water for medical purposes typified by the replacement of sea water by fresh water, water purifiers, food condensation, wastewater treatment and hemofiltration and for washing semiconductors and membrane separation type activated sludge treatment. It can particularly advantageously used in a membrane separation type activated sludge treatment method.

The invention claimed is:

1. A semipermeable membrane support used by forming a semipermeable membrane thereon, which is a wet-laid nonwoven fabric consisting of core-sheath type conjugate fibers consisting of polypropylene as a core component and polyethylene as a sheath component, wherein
the core-sheath type conjugate fibers are core-sheath type conjugate fibers A having an average fiber diameter of more than 9 μm to not more than 11 μm, and a content of the core-sheath type conjugate fibers A is 100 mass %,
a Bekk smoothness and a 75° mirror surface glossiness of a coating surface on which a semipermeable member is to be formed of the semipermeable membrane support are more than a Bekk smoothness and a 75° mirror surface glossiness of a non-coating surface on an opposite side,
the Bekk smoothness of the coating surface on which the semipermeable membrane is to be formed of the semipermeable membrane support is 1.0 to 51.0 seconds and a ratio of the Bekk smoothness of the coating surface to that of the non-coating surface is 1.3:1.0 to 1.1:1.0, and
the 75° mirror surface glossiness in a MD direction of the coating surface of the semipermeable membrane support is 10 to 30%, the 75° mirror surface glossiness in a CD direction of the coating surface of the semipermeable membrane support is 8 to 25%, and a ratio of the surface glossiness in the MD direction of the coating surface to that of the non-coating surface is 1.0:0.9 to 1.0:0.7.

* * * * *